(12) United States Patent
Middleton et al.

(10) Patent No.: US 11,895,246 B2
(45) Date of Patent: *Feb. 6, 2024

(54) DEVICES, SYSTEMS, AND METHODS FOR FACILITATING LOW TRUST AND ZERO TRUST VALUE TRANSFERS

(71) Applicant: Reginald Middleton, Brooklyn, NY (US)

(72) Inventors: Reginald Middleton, Brooklyn, NY (US); Matthew Bogosian, Anacortes, WA (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/452,782

(22) Filed: Oct. 29, 2021

(65) Prior Publication Data

US 2022/0052857 A1 Feb. 17, 2022

Related U.S. Application Data

(63) Continuation of application No. 15/309,612, filed as application No. PCT/US2015/029196 on May 5, 2015, now Pat. No. 11,196,566.

(60) Provisional application No. 61/990,795, filed on May 9, 2014.

(51) Int. Cl.
| | |
|---|---|
| *H04L 9/32* | (2006.01) |
| *G06Q 20/02* | (2012.01) |
| *G06Q 20/10* | (2012.01) |
| *G06Q 20/06* | (2012.01) |
| *G06Q 40/02* | (2023.01) |

(Continued)

(52) U.S. Cl.
CPC ........... *H04L 9/3247* (2013.01); *G06Q 20/02* (2013.01); *G06Q 20/065* (2013.01); *G06Q 20/10* (2013.01); *G06Q 40/02* (2013.01); *H04L 9/40* (2022.05); *H04L 9/50* (2022.05); *H04L 2209/56* (2013.01)

(58) Field of Classification Search
CPC . H04L 9/3247; H04L 9/40; H04L 9/50; H04L 2209/56; G06Q 20/02; G06Q 20/065; G06Q 20/10; G06Q 40/02
USPC .......................................................... 705/64
See application file for complete search history.

(56) References Cited

U.S. PATENT DOCUMENTS

| | | | |
|---|---|---|---|
| 7,587,369 B2* | 9/2009 | Ginter .................. | G06Q 20/123 713/176 |
| 9,892,460 B1* | 2/2018 | Winklevoss ........... | G06Q 40/04 |

(Continued)

OTHER PUBLICATIONS

Hearn "Contracts.", Bitcoin. Bitcoin Community, Feb. 9, 2014, from https://web.archive.org/web/20140209124419/https://en.bitcoin.it/wiki/Contracts, 6 pages (Year: 2014).*

(Continued)

*Primary Examiner* — James D Nigh

(57) ABSTRACT

Devices, systems, and methods enabling parties with little trust or no trust in each other to enter into and enforce value transfer agreements conditioned on input from or participation of a third party, over arbitrary distances, without special technical knowledge of the underlying transfer mechanism(s), optionally affording participation of third-party mediators, substitution of transferors and transferees, term substitution, revision, or reformation, etc. Such value transfers can occur reliably without involving costly third-party intermediaries who traditionally may otherwise be required, and without traditional exposure to counterparty risk.

46 Claims, 16 Drawing Sheets

(51) Int. Cl.
*H04L 9/40* (2022.01)
*H04L 9/00* (2022.01)

(56) References Cited

U.S. PATENT DOCUMENTS

| | | | |
|---|---|---|---|
| 2003/0070080 A1* | 4/2003 | Rosen | G06Q 20/381 713/187 |
| 2009/0025087 A1* | 1/2009 | Peirson, Jr. | G06Q 10/00 713/193 |
| 2009/0030768 A1* | 1/2009 | Ginter | H04L 9/3263 713/176 |
| 2010/0138659 A1* | 6/2010 | Carmichael | G06Q 20/3674 726/19 |
| 2013/0054471 A1 | 2/2013 | Samid | |
| 2013/0166455 A1* | 6/2013 | Feigelson | H04L 9/3234 705/64 |
| 2013/0179337 A1 | 7/2013 | Ochynski | |
| 2013/0212388 A1 | 8/2013 | Peter et al. | |
| 2015/0120567 A1* | 4/2015 | Van Rooyen | G06F 21/10 705/59 |
| 2015/0262171 A1* | 9/2015 | Langschaedel | G06Q 20/3829 705/71 |
| 2015/0287026 A1* | 10/2015 | Yang | G06Q 20/065 705/69 |
| 2017/0091750 A1* | 3/2017 | Maim | H04L 9/14 |

OTHER PUBLICATIONS

Antonopoulos "Mastering Bitcoin", chapters 1-4, published on GitHub May 3, 2014, 49 pages (Year: 2014).*
Antonopoulos "Mastering Bitcoin—Unlocking Digital Crypto-Currencies", O'Reilly Media, Inc., Dec. 2014, 282 pages (Year: 2014).*
Christian Decker, "Information Propagation in the Bitcoin Netork", 13th IEEE International Conference on Peer-to-Peer Computing, 978-1-4799-0521-8/13 2013, pp. 1-10.
Antonopoulos ("Mastering Bitcoin—Unlocking Digital Crypto-Currencies", O'Reilly Media, Inc., Dec. 2014 (Year: 2014).
Nakamoto, "Bitcoin: A Peer-to-Peer Electronic Cash System", www.bitcoin.org., 9 pages, Mar. 24, 2009 (year: 2009).
Ben-Sasson et al, "Zerocash: Decentralized Anonymous Payments from Bitcoin", 2014 IEEE Symposium on Security and Privacy, 16 pages, Apr. 23, 2014 (Year: 2014).
Dr. Gavin Wood, "Ethereum: a Secure Decentralised Generalised Transaction Ledger Proof-of-Concept V," May 6, 2014.

* cited by examiner

DEVICES, SYSTEMS, AND METHODS FOR FACILITATING LOW TRUST AND ZERO TRUST VALUE TRANSFERS

CROSS-REFERENCE TO RELATED APPLICATIONS

This application is a continuation application of U.S. Ser. No. 15/309,612 filed on Nov. 8, 2016, which is a National Stage filing under 35 U.S.C. § 371 of PCT Ser. No. PCT/US15/29196 filed on May 5, 2015, which claims priority to U.S. provisional application 61/990,795 filed on May 9, 2014. This application incorporates the disclosures of an applications mentioned in this paragraph by reference as if fully set forth herein.

COPYRIGHT STATEMENT

All material in this document, including the figures, is subject to copyright protections under the laws of the United States and other countries. The owner has no objection to the reproduction of this document or its disclosure as it appears in official governmental records. All other rights are reserved.

TECHNICAL FIELD

Related technical field(s) are: telecommunications, digital communications, and computer technology.

BACKGROUND ART

Overview

Market efficiency tends to increase—and therefore transaction costs tend to decrease—in proportion to the degree that transacting parties trust each other. However, rent extraction tends to increase—and therefore trust decreases—in proportion to market size.[1] Efficient and productive participation in larger markets therefore requires mitigating trust issues, but that comes at a cost. That cost can often be reduced by economies of scale, but even today, there is substantial overhead from buffering against risks introduced by counterparties, intermediaries, post-delivery payment failures, guarantor failures, escrow, etc.

[1] Rose, David C. The Moral Foundation of Economic Behavior. New York: Oxford UP, 2011. Print.

Since the mid 1990s, there has been an explosion of commercial activity where parties previously unknown to each other agree to transact using the internet as the fundamental communication medium, sometimes even across international borders. Establishing and maintaining trust between those parties has played a central role, and various crude solutions based on traditional, but inefficient methods have been attempted (e.g., electronic exchanges with expensive fees, "online" escrow and dispute resolution using third parties, various reputation systems, third party guarantors, etc.).

Among those markets where individuals interact are those which trade financial instruments (e.g., stocks, bonds, options, futures, swaps, currency exposure, etc.). With the advent of financial engineering, individuals and businesses have been able to leverage computing in financial trading, including automating the process of entering and exiting trades based on programmable conditions or algorithms. However, even with the explosion of the use of technology in this space, such technology is overwhelmingly layered on top of legacy centralized markets. Nearly all impose relatively large costs to conduct trades with counterparties. Some very high-volume exchanges sell the ability for "high value" (i.e., high-paying) customers to cut in line ahead of less savvy or less well equipped investors. Some have questioned the fairness of this practice.

Further, the cost of contract enforcement in international trade can be prohibitive, and success might be very difficult to predict. In addition, a seller may wish to receive one currency, and a buyer may wish to send another. The value of one currency denominated in another can be volatile. Historically, one way that remote parties have mitigated risk is to engage the assistance of trusted intermediaries. One such mechanism is a letter of credit (L/C). L/Cs are appropriate where a seller does not know whether to trust a buyer wishing to place a large order, but does trust a bank where the buyer has established a line of credit. The buyer and bank agree that the bank will release funds from that line of credit to the seller when the seller meets certain conditions (most often transmitting evidence of shipment to the bank before a certain date). The bank provides the promise (L/C) to the seller, and the seller and buyer agree on the remaining terms of the transaction. However, payment often happens at a later date than the agreement, and exchange rates could vary between the time that the agreement was struck and the time payment is received. Only the largest of institutions have the resources necessary to properly hedge against exchange rate volatility. Additionally, the fees charged by banks for L/Cs and currency exchanges are substantial. Perversely, a high degree of trust must also be placed in the intermediary institution(s), who effectively acts as self-interested document examiners who may or may not independently verify the veracity of said documents before releasing the funds, perhaps leaving much of the risk of mistake, forgery, or fraud on the shoulders of the seller. As such, L/Cs are typically not well-suited for consumer transactions, or where transactions involve currencies whose values may vary wildly in relation to each other. Decentralized digital currencies (or so-called "cryptocurrencies")—technologies that promise tightly-controlled asset creation coupled with the ability to transfer control or ownership of those assets computationally when rigorously-defined criteria are met, with little-or-no dependency on third party intermediaries, and with very low transaction costs compared to traditional mechanisms—are relatively new creatures. The Bitcoin protocol and progeny (Ethereum, Litecoin, etc.) are one such class of technologies that have recently enjoyed meteoric rises in popularity (and valuation).

For the purposes of illustration by way of non-limiting example, those particular decentralized digital currencies generally operate by maintaining a whole or partial history or "ledger" (sometimes referred to as a "block chain") of all transactions that have been "validated" by a consensus of network participants. With few exceptions beyond the scope of the invention, transactions function roughly as follows.[2] A transaction comprises at least one input and at least one output. The input comprises an input "script", which comprises an ordered set of well-defined executable operations. The output comprises an output script, which comprises a second ordered set of such operations. A new (child) transaction comprises an input whose input script is combined with the output script from an existing (parent) transaction in a predictable way. The new transaction is considered valid if a majority of network participants agree that the combination, when evaluated according to a predetermined set of rules, produces an anticipated state or result. A transaction output is considered "spent" if it is accepted by a majority of network participants as associated with a valid child transaction. A transaction output is considered "unspent" if, according to a majority of network participants, it is not associated with any valid child transaction. The concept of "ownership" or "title" of a transaction output is determined by which entity may exercise control over said output, or, more specifically, who may create and/or expose new transactions to "spend" said output that will be accepted by a majority of network participants as valid.

[2] This is an oversimplification of the Bitcoin protocol. More detailed information may be found on the Bitcoin Wiki <https://en.bitcoin.it/>. Details regarding the Ethereum protocol may be found on the Ethereum Wiki <https://github.com/ethereum/wiki/wiki>.

More specifically, the entity seeking to submit a new transaction to the ledger transmits (or "broadcasts") a transaction record comprising the details of the desired transaction to a number of network participants then known to the entity (or "peers"). Those peers typically attempt to independently validate the transaction record. If successful, they rebroadcast the transaction record to their peers, and so on. Eventually the transaction record is received by a network participant who is configured to effect the transaction by including the transaction record in the ledger (i.e., in a valid "block"; see more detailed description below).

A transfer occurs when an entity produces a child transaction that is accepted by a majority as valid, and whose input is associated with an unspent output from a parent transaction. In most cases, this is a simple transfer of control to a second entity, where the new transaction's output script is a small set of operations for which creating a corresponding input script is computationally simple for a single entity in possession of a particular asymmetric cryptography key pair, and computationally impractical for all others. In other words, it is "addressed" to an entity with access to a particular private key. Existing software abstracts these addresses and simple transactions sufficiently for laypersons to engage in them without being programmers or protocol experts.

However, many more complex scripts describing conditions under which a transaction may be accepted as valid are contemplated by the set of available operations. Because the general means of describing those operations is typically binary or programming code[3], arbitrary transactions cannot generally be created or understood by laypersons. For example, as of Apr. 21, 2014, the Bitcoin Contracts Wiki page comprises brief instructions for several theoretical "example" transactions.[4] In each, irrespective of role in the transaction, laypersons are unlikely able to understand—much less follow—these instructions. Fundamental steps are missing that would enable them to confidently conduct similar transactions, much less combinations of such transactions. Despite its great potential, this kind of complexity without abstraction has likely frustrated adoption of the Bitcoin protocol and progeny for anything besides "simple" payments in traditional markets.

[3] See, e.g., "bitcoind—How Can I Create a Multi Signature 2-of-3 Transaction?" StackExchange, 23 Mar. 2014. Web. 21 Apr. 2014. <https://bitcoin.stackexchange.com/questions/3712/how-can-i-create-a-m-ulti-signature-2-of-3-transaction>.
[4] Hearn, Mike. "Contracts." Bitcoin. Bitcoin Community, 9 Apr. 2014. Web. 21 Apr. 2014. <https://en.bitcoin.it/wiki/Contracts>.

Decentralized Digital Currencies or "Cryptocurrencies"

The design and functioning of the Bitcoin protocol and progeny can generally be described as follows.[5] While this section often refers to "Bitcoin" by name, the description is accurate for nearly all of the decentralized digital currencies currently known in the art.

[5] Adapted from <https://en.wikipedia.org/wiki/Bitcoin> and <https://en.bitcoin.it/wiki/Contracts>.

Block chain—The "block chain" is a public ledger that records bitcoin transactions. A novel solution accomplishes this without any trusted central authority: maintenance of the block chain is performed by a network of communicating nodes running bitcoin software. Transactions of the form "payer X sends Y bitcoins to payee Z" are broadcast to this network using readily available software applications. Network nodes can validate transactions, add them to their copy of the ledger, and then broadcast these ledger additions to other nodes. The block chain is a distributed database; in order to independently verify the chain of ownership of any and every bitcoin (amount), each network node stores its own copy of the block chain. Approximately six times per hour, a new group of accepted transactions, a block, is created, added to the block chain, and quickly published to all nodes. This allows bitcoin software to determine when a particular bitcoin amount has been spent, which is necessary in order to prevent double-spending in an environment without central oversight. Whereas a conventional ledger records the transfers of actual bills or promissory notes that exist apart from it, the block chain is the only place that bitcoins can be said to exist in the form of unspent outputs of transactions.

Units—The unit of account of the bitcoin system is bitcoin (BTC). Small multiples of bitcoin used as alternative units are millibitcoin (mBTC), microbitcoin (.mu.BTC), and satoshi. Named in homage to bitcoin's creator, a "satoshi" is the smallest multiple of bitcoin representing 0.00000001 bitcoin, which is one hundred millionth of a bitcoin. A "millibitcoin" equals to 0.001 bitcoin, which is one thousandth of bitcoin. One "microbitcoin" equals to 0.000001 bitcoin, which is one millionth of bitcoin. A microbitcoin is sometimes referred to as a "bit".

Ownership—(See FIG. 24.) Ownership of bitcoins implies that a user can spend bitcoins associated with a specific address. To do so, a payer must digitally sign the transaction using the corresponding private key. Without knowledge of the private key the transaction cannot be signed and bitcoins cannot be spent. The network verifies the signature using the public key. If the private key is lost, the bitcoin network will not recognize any other evidence of ownership; the coins are then unusable, and thus effectively lost. For example, in 2013 one user said he lost 7,500 bitcoins, worth $7.5 million at the time, when he discarded a hard drive containing his private key.

Transactions—Normally, a transaction must have one or more inputs ("coinbase" transactions are special transaction for creating bitcoins and have zero inputs; see "Mining" and "Supply" below). For the transaction to be valid, every input must be an unspent output of a previous transaction. Every input must be digitally signed. The use of multiple inputs corresponds to the use of multiple coins in a cash transaction. A transaction can also have multiple outputs, allowing one to make multiple payments in one go. A transaction output can be specified as an arbitrary multiple of satoshi. Similarly as in a cash transaction, the sum of inputs (coins used to pay) can exceed the intended sum of payments. In such case, an additional output is used, returning the change back to the payer. Any input satoshis not accounted for in the transaction outputs become the transaction fee.

Every transaction record can have a "lock time" associated with it. This prevents the transaction from being accepted as valid and allows the transaction to be pending and replaceable until an agreed-upon future time. In the case of the Bitcoin and similar protocols, this can be specified either as a block index or as a timestamp. The transaction record will not be accepted for inclusion in the block chain until the transaction's lock time has been reached. Other, more flexible mechanisms have also been proposed.[6]

[6] See, e.g., "BIP-65: Revisiting nLockTime" Qntra.net, 13 Nov. 2014. Web. 4 May 2015. <http://qntra.net/2014/11/bip-65-revisiting-nlocktime/>.

Mining—"Mining" is a record-keeping service. Miners keep the block chain consistent, complete, and unalterable by repeatedly verifying and collecting newly broadcast transactions into a new group of transactions called a "block". A new block contains information that "chains" it to the previous block thus giving the block chain its name. It is a cryptographic hash of the previous block, using the SHA-256 hashing algorithm.

A new block must also contain a so-called "proof-of-work". The proof-of-work consists of a number called a "difficulty target" and a number called a "nonce", which is jargon for "a number used only once". Miners have to find a nonce that yields a hash of the new block numerically smaller than the number provided in the difficulty target. When the new block is created and distributed to the network, every network node can easily verify the proof. On the other hand, finding the proof requires significant work since for a secure cryptographic hash there is only one method to find the requisite nonce: miners try different integer values one at a time, e.g., 1, then 2, then 3, and so on until the requisite output is obtained. The fact that the hash of the new block is smaller than the difficulty target serves as a proof that this tedious work has been done, hence the name "proof-of-work".

The proof-of-work system alongside the chaining of blocks makes modifications of the block chain extremely hard as an attacker must modify all subsequent blocks in order for the modifications of one block to be accepted. As new blocks are mined all the time, the difficulty of modifying a block increases as time passes and the number of subsequent blocks (also called "confirmations" of the given block) increases.

Supply—The successful miner finding the new block is rewarded with newly created bitcoins and transaction fees. As of 28 Nov. 2012, the reward amounted to 25 newly created bitcoins per block added to the block chain. To claim the reward, a special transaction called a "coinbase" is included with the processed payments. All bitcoins in circulation can be traced back to such coinbase transactions. The bitcoin protocol specifies that the reward for adding a block will be halved approximately every four years. Eventually, the reward will be removed entirely when an arbitrary limit of 21 million bitcoins is reached c. 2140, and record keeping will then be rewarded by transaction fees solely.

SUMMARY OF INVENTION

The invention pertains to systems and methods enabling parties with little trust or no trust in each other to enter into and enforce agreements conditioned on input from or participation of a third party, over arbitrary distances, without special technical knowledge of the underlying transfer mechanism(s), optionally affording participation of third-party mediators, substitution of transferors and transferees, term substitution, revision, or reformation, etc. Such exchanges can occur reliably without involving costly third-party intermediaries who traditionally may otherwise be required, and without traditional exposure to counterparty risk.

This application explores example embodiments enabling two forms of value transfer: arbitrary swaps and L/Cs. Arbitrary swaps and L/Cs are useful as illustrative examples because traditionally the two are very different animals. However, the invention allows for their expression and enforcement in remarkably similar terms. As one skilled in the art will appreciate, the invention can be applied to many other forms of value transfer as well.

In one example, Party A believes that bitcoins (BTC) will rise in notional terms when valued in New Zealand dollars (NZD) over the next few weeks. Party B believes the opposite is true, that BTC will fall when valued in NZD over a similar timeframe. Neither parties are aware of each other, but each wants to place a small bet in accordance with their respective beliefs. One embodiment of the invention allows those parties to discover each other, collaborate with each other to agree on concrete terms, propose transactions reflecting their agreement, and finally enforce that agreement without traditional, costly measures.

In another example, Party A is a merchant who wishes to allow her customers to trade their BTC for her services. However, she would rather receive US dollars (USD) because she is concerned about the volatility of BTC. Party A is not concerned about whether BTC will rise or fall when valued in USD. Periodically (e.g., once per day, hour, etc., or even once per transaction where she receives BTC), she can offer to sell exposure to BTC valued in USD in proportion to the BTC she receives from her customers. In other words, she swaps her exposure to BTC in exchange for exposure to USD. Party B has fewer BTC and more USD than he wants, and desires increased exposure to BTC valued in USD. One embodiment of the invention allows Party B to find and exchange—or "swap"—exposures with Party A, allowing Party A to accept BTC in exchange for her goods or services knowing that she will be compensated by Party B if her BTC lose value against USD, in exchange for Party B being able to keep any upside if BTC gains in value against USD. Another embodiment seeks out these swaps automatically upon detection of Party A's ownership of additional BTC.

Combinations are possible. For example, Party A accepts Australian dollars (AUD), but prefers USD, and wants to hedge against volatility of AUD in USD. One embodiment of the invention allows Party A to swap exposure to USD in BTC with Party B, and simultaneously swap exposure to BTC in AUD with Party C over a similar time period, thereby synthesizing a hedge against AUD in USD. The invention is not limited such that Party B and Party C are distinct parties (they could be the same), nor is it limited such that such that Party A must conduct two separate trades. In addition, various embodiments of the invention allow the parties to perform these types of transactions without maintaining currency deposits or making currency purchases or exchanges.

In yet another example, Party A wishes to purchase goods from Party B. The parties do not know each other well. Party B wants assurances of availability of funds from Party A, but Party A does not want to release those funds to Party B (or an assignee) until Party B has demonstrated proof of shipment (or met some other condition)

In one embodiment comprising a swap, a first device called a "client" and a second client participate in a series of transactions where assets (e.g., unspent transaction outputs) from a first party and assets from a second party are committed until a combination of two of the first party, the second party, and an intermediary release them in accordance with a calculation by the intermediary based on observation of external state, such as the relative value of certain financial instruments at a specific time.

In another embodiment comprising a L/C, a first client and a second client participate in a series of transactions where assets from a first party are committed until either the first client or an intermediary releases them based on observation of external state, such as verification of delivery to a shipper or an address.

In a further embodiment, the assets may be refunded if no such observation can be made by an expiration timestamp.

In yet another embodiment, the commitment of assets may be extended pending a settlement facilitated by a mediator.

DESCRIPTION OF THE EMBODIMENTS

Figure 1:
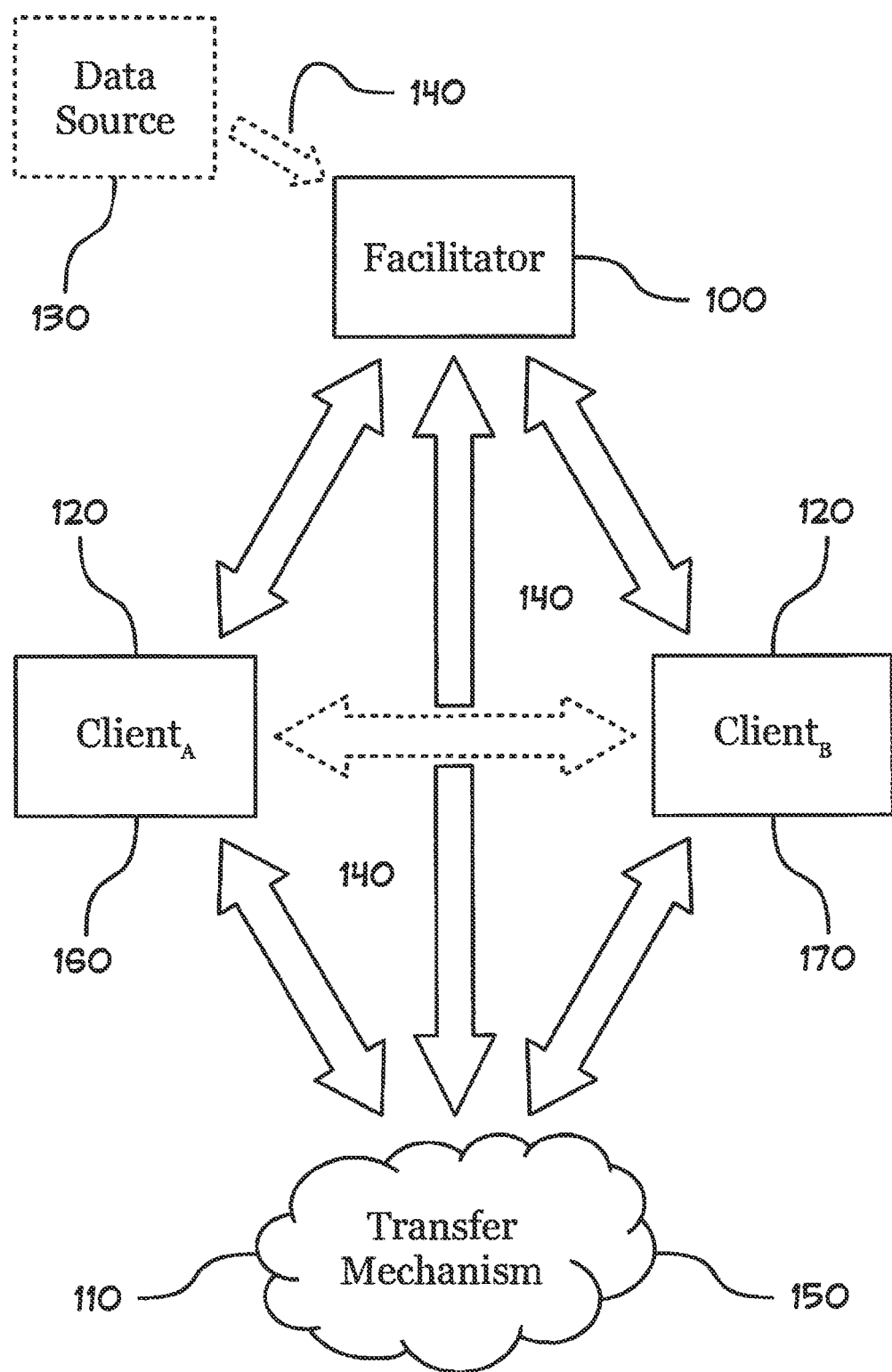
FIG. 1 depicts a typical embodiment for practicing the invention, especially for use with or comprising a transfer mechanism (110) such as a decentralized digital currency (150), where the clients (120, 160, 170), transfer mechanism (110, 150), facilitator (100), and data source (130) are distinct participants connected by a computer network (140).

The invention is not limited to the following embodiments. The description that follows is for purpose of illustration and not limitation. Other systems, methods, features and advantages will be or will become apparent to one skilled in the art upon examination of the figures and detailed description. It is intended that all such additional systems, methods, features, and advantages be included within this description, be within the scope of the inventive subject matter, and be protected by the accompanying Claims.

For example, the Bitcoin protocol is often used in this application as an illustrative vehicle. However, the invention is not limited by the Bitcoin protocol specifically. Any technology making it sufficiently difficult to recharacterize ownership of assets (virtual or otherwise) unless certain rigorously-defined criteria are met may be substituted. The invention is not limited to decentralized or centralized transfer mechanisms. For example, in one embodiment transactions could be recognized (i.e., facilitated) by an authority (centralized). In another embodiment, they could be validated by election (distributed), etc.

Further, while the Bitcoin protocol and similar technologies explicitly identify "inputs" and "outputs" for transactions, the invention is not limited to such transfer mechanisms. Various embodiments of the invention may be practiced in any context in which ownership of an asset can be recharacterized, provided the transfer mechanism exposes the necessary features. This application uses "input" and "output" both literally (e.g., with respect to technologies like the Bitcoin protocol and progeny) as well as figuratively (e.g., with other technologies such as those modeled after double-entry accounting, chain-of-title, etc.). In a more traditional model, for example, an "input" might comprise an amount of some or all of an available "balance" in an "account" under one entity's direction or control (e.g., at a traditional bank). An output might comprise a reference to another entity's account (e.g., an account number). In such a model, recharacterization of assets occurs when—once certain conditions are met—the balance of the first entity's account is decremented and (preferably atomically) the balance of the second entity's account is incremented. This is but one example of alternative transfer mechanisms with which the invention may be practiced.

In addition, this application may disclose or imply aspects of the invention comprising a "display", a "user input", a "display device", a "user input device", or similar term. However, this invention is not limited to being practiced only by persons with common natural abilities. "Display [device]" is intended to comprise any device capable of unambiguously communicating information to a human being via any of the senses, or combinations of senses. For example, blind persons could use the device with an "audio display", which may comprise a text-to-speech synthesizer. Alternately, a braille terminal could be used. Similarly, "user input [device]" is intended to comprise any device capable of receiving information from a human being. Modernly, popular user input devices comprise a keyboard, a mouse, a touch screen, etc., but could be a speech-to-text converters, sip-and-puff devices, click-and-type devices, motion or gesture recognition devices, etc. These are but a few examples. A diversity of such display and user input devices are known in the art and may be used when practicing the invention, as will become apparent to one skilled in the art.

In the embodiment depicted in FIG. 1, the invention comprises some or all of the depicted participants on a computer network. The participants comprise a first client (A) typically operated for a first party (not depicted) coupled to the computer network (either persistently or intermittently), a second client (B) typically operated for a second party (not depicted) coupled to the computer network (either persistently or intermittently), a transfer mechanism accessible via the computer network, a facilitator accessible to the computer network, and optionally one or more data sources accessible by the facilitator. In a typical embodiment, the computer network comprises the internet and related technologies, but this is not a requirement. Other configurations are possible. For example the computer network could comprise multiple, independent computer networks for connecting any subset of the participants, including private networks, VPNs, secure tunnels, frame relays, etc. Non-limiting modern examples include various standards implemented in hardwire, firmware, or software, and often used in conjunction ("stacked") with each other such as: Ethernet, wireless Ethernet (W-Fi), mobile wireless (e.g., CDMA, FDMA, SDMA, TDMA, GSM (GRPS), UMTS, EDGE, LTE, etc.), Bluetooth, Firewire, USB, IP, TCP, UDP, SSL, etc. Any computer networking technology will suffice so long as it affords communication between the various participants at times consistent with practicing the invention.

In a typical embodiment, each of the first client, the second client, and the facilitator comprises a computer processor configured to perform certain steps within the scope of the invention. In some embodiments, such as those using the Ethereum protocol as the transfer mechanism, the facilitator comprises instructions for computation which are evaluated by network participants in a proof-of-work protocol, in which case a network participant comprises a computer processor configured to evaluate the instructions for computation. In many embodiments, a client comprises a display device and an input device for interacting with a human being, but this is not strictly necessary. In other embodiments, a client could be fully automated, requiring no human intervention. In one such embodiment, the computer processor of the first client is configured to monitor aspects of the transfer mechanism, the facilitator, the data source, the second client, or some other input, and is configured to interact automatically with the various participants based on an observed change of state.

For example, in one embodiment, the transfer mechanism comprises the Bitcoin protocol, and each of the clients, and the facilitator comprises a non-transitory data store for storing key pairs, inchoate transactions, etc. The first client is configured such that when it observes that it acquires new ownership of BTC, it initiates an offer via the facilitator to trade exposure to one financial instrument or asset class (e.g., BTC) in exchange for exposure to another financial instrument or asset class (e.g., USD).

FIG. 1 depicts a typical embodiment for practicing the invention—especially for use with a distributed transfer mechanism—where the clients, transfer mechanism, facilitator, and data source are distinct participants. However, the depicted arrangement is not the only one contemplated by the invention. In an alternate embodiment, the facilitator provides some or all aspects of the transfer mechanism. In another embodiment, the facilitator comprises some or all aspects of a client. For example, part or all of a client's data store, the ability to initiate or accept offers, etc., could be "embedded" in the facilitator, thereby enabling the facilitator to operate as a client itself (e.g., one controlled by the owners of the facilitator, or on behalf of a third party who has entrusted control to the facilitator). In yet another embodiment, the facilitator comprises the data source. Many configurations are contemplated by the invention are possible, and will become apparent to one skilled in the art.

Figure 2:
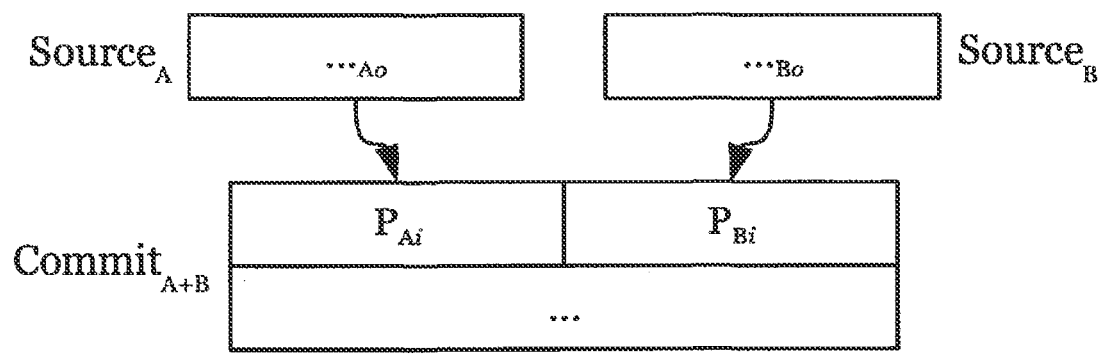
FIG. 2 depicts aspects of one embodiment pertaining to a swap comprising one or more source transactions and a commit transaction.

FIG. 2 depicts aspects of one embodiment pertaining to a swap comprising one or more source transactions and a commit transaction. As depicted, the commit transaction comprises a first input for accepting a first amount from a first source transaction (i.e., from a first party), a second input for accepting a second amount from a second source transaction (i.e., from a second party), and one or more outputs for directing portions of those amounts to one or more other transactions (not depicted), where the first amount and second amount total an expected amount. In many cases, the first and second amounts are equivalent, but not necessarily. In some cases the amounts comprise a principal amount (P), and (optionally) a collateral amount (C), as depicted in the various figures.

In a typical embodiment, the commit transaction is configured such that some or all of the amounts available via its output(s) may only be spent with confirmation from at least two of the first party, the second party, the facilitator, and optionally a third party (such as a mediator). In an alternate embodiment, the commit transaction is configured such that some or all of the amounts available via its outputs may only be transferred with confirmation from one of the facilitator and optionally a trusted third party, and one of the first party and the second party. In another alternate embodiment, the commit transaction is configured such that some or all of the amounts available via its outputs may only be transferred with confirmation from either the facilitator or two of the first party, the second party, and optionally a trusted third party. These are non-limiting examples. In addition to the examples presented herein, commit transactions may be configured such that outputs vest ownership in a conjunction of any number of parties, somewhat analogous to a checking account where checks must be signed by two authorized parties in order to be honored.

While a first source transaction and a second source transaction are depicted in FIG. 2, this should not be construed as a limitation of the invention. Amounts may be input into the commit transaction from any number different sources. Excesses may be refunded back to respective parties, or different parties altogether. The only limitation is that the commit transaction comprises inputs totaling at least the expected amount. In some embodiments, fees (not depicted) may be imposed for directing the amounts from their respective sources to said inputs, which may require adjusting the source transactions to compensate for those fees. For example, transfer mechanisms may impose transfer fees, withdrawal fees, wire fees, etc. The Bitcoin protocol, for example, may require a "mining fee" in order to ensure timely inclusion of the transaction in the block chain.

Figure 3:
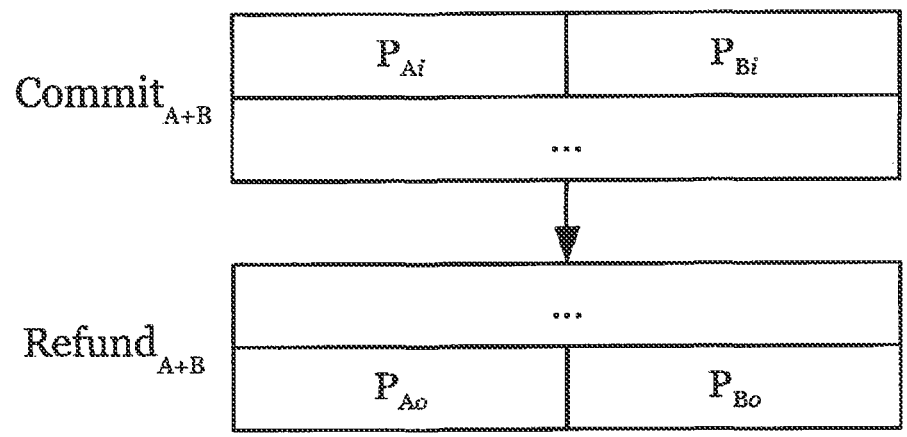
FIG. 3 depicts aspects of one embodiment pertaining to a swap comprising a commit transaction and a refund transaction.

FIG. 3 depicts aspects of one embodiment pertaining to a swap comprising a commit transaction and a refund transaction. The commit transaction comprises a first input for receiving a first principal amount ($P_A$), a second input for receiving a second principal amount ($P_B$), and a commit output. The refund transaction comprises an input for receiving an amount from the commit output, a first refund output to the first party, and a second refund output to the second party. In a typical embodiment, a refund transaction record is not created until well after the commit transaction, or it is created such that it is only valid after a certain time in the future and only if the commit output has not yet been spent. This allows another transaction to come before it and spend the commit output, but if no such other transaction is created, the refund transaction record can be submitted to the transfer mechanism to create a refund transaction to put the parties back in or close to their original positions.

Figure 4:
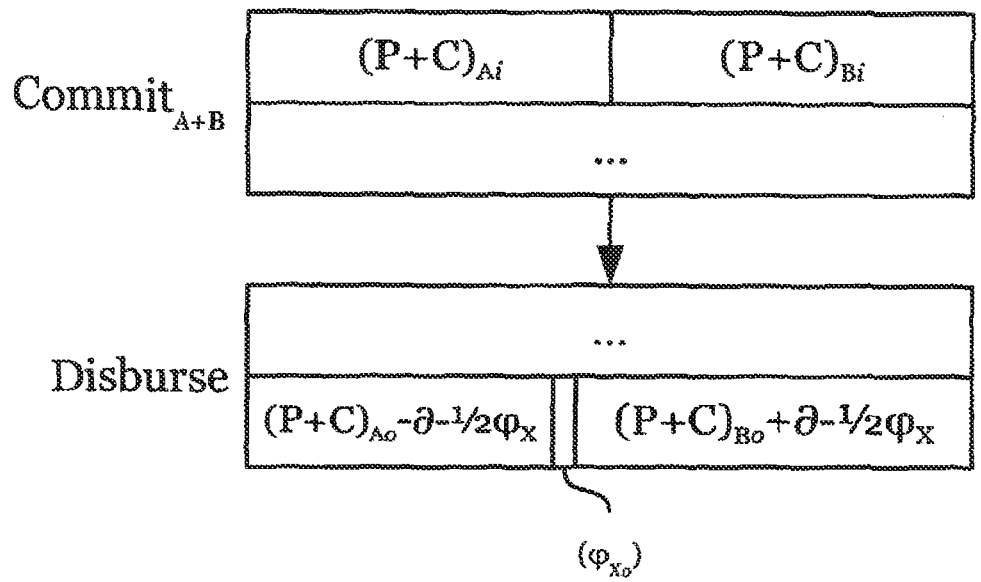
FIGS. 4-5 depict aspects of swap embodiments comprising relatively simple disbursement transactions in a swap situation involving principal and collateral.
Figure 5:
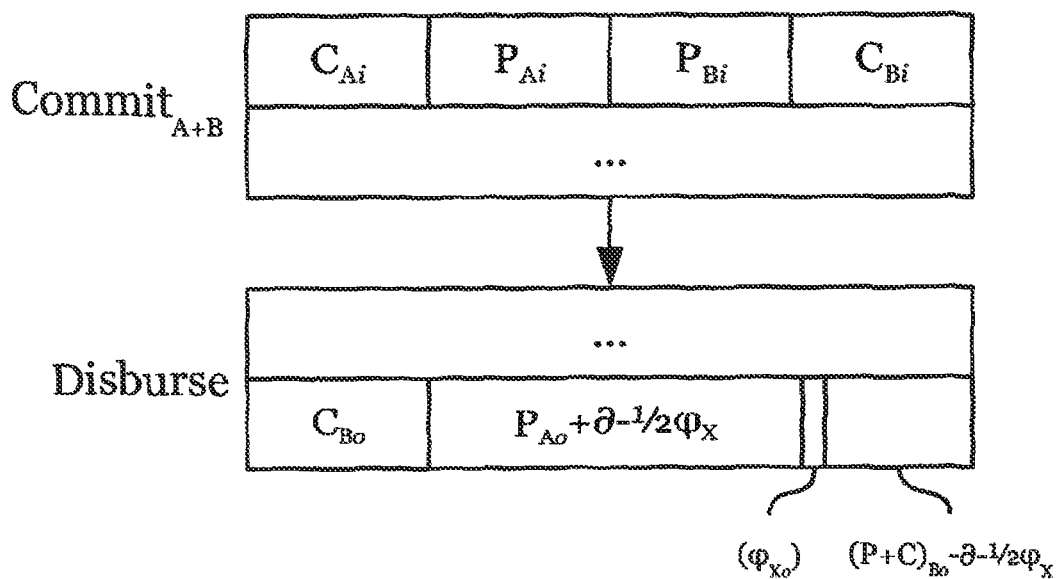

FIGS. 4-5 depict aspects of swap embodiments comprising relatively simple disbursement transactions in a swap situation involving principal and collateral. In FIG. 4, the commit transaction comprises a first joined principal and collateral input from a first party and a second joined principal and collateral input from a second party. In FIG. 5, the commit transaction comprises a first principal ($P_A$) input from a first party, a first collateral ($C_A$) input from the first party, a second principal ($P_B$) input from a second party, and a second collateral ($C_B$) input from the second party. These are but two of many possible configurations that will become apparent to one skilled in the art. For example, a commit transaction could comprise a principal input from a first party, a collateral input from a second party (e.g., a guarantor of the first party, not depicted), and a joined principal and collateral input from a third party.

In the embodiments depicted in FIGS. 4-5, each of the disbursement transactions comprises an input for receiving an amount from the commit output. In FIG. 4, the disbursement transaction comprises a first joined modified principal and collateral disbursement output to the first party, a second joined modified principal and collateral disbursement output to the second party, and an optional fee ($\varphi$) output to a third party. In FIG. 5, the disbursement transaction comprises a collateral disbursement output to the first party, a modified principal disbursement output to the first party, a modified collateral disbursement output to the second party, and an optional fee output to a third party. Again, these are but two of many possible configurations that will become apparent to one skilled in the art. For example, analogous to above, a disbursement transaction could comprise a modified principal disbursement output to a first party, a possibly modified (if the principal was exhausted) collateral disbursement output to a third party (e.g., a guarantor of the first party), or a joined modified principal and possibly modified (if the principal was exhausted) disbursement collateral output to a second party.

In each of the embodiments depicted in FIGS. 4-5, the fee is allocated from the modified principals and is shared equally among the parties to the trade, although this is not required. It could be allocated at any stage, or multiple stages. It could be born solely or disproportionately by one party. Also, in each of the embodiments depicted in FIGS. 4-5, the calculation of the amounts for two or more disbursement outputs comprises a difference ($\ominus$), which is positive to one party, and negative to another party. The disbursement transaction in the embodiment depicted in FIG. 5 would be characteristic, for example, of a swap in which the second principal was exhausted before the expiration of the swap, thereby requiring that an amount be allocated from the collateral. In other words, where:

$$\delta > (P+C)_A - \frac{1}{2}\phi \quad [\text{eq. 1}]$$

To illustrate by way of example how some of the various components above may be used together to facilitate various basic swap agreements, the following steps occur in one embodiment using the Bitcoin or similar protocol as the transfer mechanism, where the parties do not trust each other, and the facilitator is not fully trusted by any of the parties:

1. A first client transmits an offer to a facilitator, the offer comprising terms, the terms comprising:
   a. a reference to a data source comprising at least one of: a base instrument and a quote instrument;
   b. a principal amount;
   c. an expiration timestamp;
   d. optionally a reference to a denominating asset;
   e. optionally, a collateral amount; and
   f. optionally, a disbursement function;
   Example Terms:
   Base: USD
   Quote: AUD
   Denominating: BTC
   Principal: 0.5 (BTC)
   Collateral: 2×principal $$f(b_o, q_o, b_f, q_f): \ 100 \times \text{principal}\left(\frac{b_f}{b_o} - \frac{q_f}{q_o}\right)$$

Expiration: 2014-06-01T12:34:56Z
2. Optionally, the facilitator validates aspects of the offer (e.g., that the facilitator can interpret the terms, that the expiration timestamp is within an acceptable range, etc.). If validation fails, the facilitator may reject the offer, optionally with an error message to the first client. [0080] 3. A second client retrieves the offer from the facilitator.
4. The first client creates a first source transaction record comprising a transaction ID to the transfer mechanism.
5. The second client creates a second source transaction record comprising a transaction ID to the transfer mechanism.
6. The second client transmits the transaction ID of the second source transaction record to the first client, optionally via the facilitator, in such a way that it is associated with the offer (e.g., in the same message, via an offer ID, offer hash, etc.). In another embodiment the first client transmits the transaction ID of the first source transaction record to the second client, and subsequent steps mirror the following of this embodiment.
7. One of the second client and the facilitator transmits a second public key to the first client in such a way that it is associated with the offer.
8. The first client signs (i.e., computes a cryptographic signature and associates it with) a first principal input of an inchoate commit transaction record for creating a complete commit transaction record, the inchoate commit transaction record comprising:
   a. the first principal input for receiving a first principal amount from a first source transaction; [0087] b. a second principal input for receiving a second principal amount from a second source transaction; and
   c. a commit output comprising a commit amount and a condition requiring signatures of private keys corresponding to two of:
   i. a first public key;
   ii. the second public key; and
   iii. a facilitator public key.
   Example Inchoate Commit Transaction Record:

---
Input:
    Previous tx 85e5...e61f
    Index: 1
    scriptSig: efd6...ea1601 a6a6...2c2b
Input:
    Previous tx: 705d...9ce2
    Index: 0
    scriptSig: [sig. placeholder]
...
Output:
    Value: 300000000
    scriptPubKey: 2 67c1...4a70 bf9a...f9e3 cffd...1373 3
    OP_CHECKMULTISIG
...
---

9. The first client transmits the inchoate commit transaction record to the second client, optionally via the facilitator. Optionally, the facilitator validates aspects of the inchoate commit transaction record (e.g., that inchoate commit transaction record is signed by a first party, that the first principal amount and the second principal amount each satisfy the terms, etc.). If validation fails, the facilitator may reject the inchoate commit transaction, optionally with an error message to the first client. Optionally, the facilitator transmits the offer and the inchoate commit transaction record to the second client.

10. Optionally, the second client verifies that the inchoate commit transaction record is as expected, signed by the first party, etc.

11. The second client creates the complete commit transaction record by signing the inchoate commit transaction record and optionally saves a copy in non-transitory memory, the complete commit transaction record comprising:

a. the first principal input for receiving the first principal amount from the first source transaction;

b. a second principal input for receiving a second principal amount from the second source transaction; and c. a commit output comprising a commit amount and a condition requiring signatures of private keys corresponding to two of:

i. the first public key;

ii. the second public key; and iii. the facilitator public key.

Example Complete Commit Transaction Record:

```
ID: 6b24...b607
Input:
    Previous tx: 85e5...e61f
    Index: 1
    scriptSig: efd6...ea1601 a6a6...2c2b
Input:
    Previous tx: 705d...9ce2
    Index: 0
    scriptSig: 78eb...fc4501 531f...00dd
...
Output:
    Value: 300000000
    scriptPubKey: 2 67c1...4a70 bf9a...f9e3 cffd...1373 3
    OP_CHECKMULTISIG
...
```

12. The second client signs an inchoate refund transaction record comprising:

a. a lock time after the expiration timestamp;

b. an input for receiving the commit amount from a commit transaction;

c. a first refund output comprising a first refund amount and a first condition requiring approval of the first party; and d. a second refund output comprising a second refund amount and a condition requiring approval of a second party.

Example Inchoate Refund Transaction Record:

```
Input:
    Previous tx: 6b24...b607
    Index: 0
    scriptSig: OP_0 [sig. placeholder] c255...d80301
Output:
    Value: 149995000
    scriptPubKey: OP_DUP OP_HASH160 53a5...8974
    OP_EQUALVERIFY OP_CHECKSIG
Output:
    Value: 149995000
    scriptPubKey: OP_DUP OP_HASH160 30e6...2511
    OP_EQUALVERIFY OP_CHECKSIG
...
nLockTime: 2014-06-03T12:34:56Z
```

13. The second client transmits the complete commit transaction record and the inchoate refund transaction record to the first client, optionally via the facilitator. Optionally, the facilitator validates aspects of the complete commit transaction record and the inchoate refund transaction record (e.g., that complete refund transaction record is signed by the first party and the second party, that inchoate refund transaction record is signed by the second party, that aspects of the complete commit transaction record match the inchoate commit transaction record, that the first refund amount of the inchoate refund transaction record is not more than the first principal amount, that the second refund amount of the inchoate refund transaction record is not more than the second principal amount, that the lock time is after the expiration timestamp, etc.). If validation fails, the facilitator may reject the inchoate refund transaction record or the complete commit transaction record, optionally with an error message to the second client. Optionally, the facilitator transmits the complete commit transaction record and the inchoate refund transaction record to the first client.

14. Optionally, the first client verifies that the complete commit transaction record is as expected and signed by the first party and the second party, that the inchoate refund transaction record is as expected and is signed by the second party, etc.

15. Optionally, the first client saves a copy of the complete commit transaction record in non-transitory memory.

16. The first client creates a complete refund transaction record and saves a copy in non-transitory memory, the complete refund transaction record comprising:

a. a lock time after the expiration timestamp;

b. an input for receiving the commit amount from the complete commit transaction;

c. a first refund output comprising a first refund amount and a first condition requiring approval of the first party; and a second refund output comprising a second refund amount and a condition requiring approval of the second party.

Example Complete Refund Transaction Record:

```
ID: d5f8...8ab5
Input:
    Previous tx: 6b24...b607
    Index: 0
    scriptSig: OP_0 b859...452c01 c255...d80301
Output:
    Value: 149995000
    scriptPubKey: OP_DUP OP_HASH160 53a5...8974
    OP_EQUALVERIFY
    OP_CHECKSIG
Output:
    Value: 149995000 s
    criptPubKey: OP_DUP OP_HASH160 30e6...2511
    OP_EQUALVERIFY
    OP_CHECKSIG
...
nLockTime: 2014-06-03T12:34:56Z
```

17. The first client transmits the complete refund transaction record to the second client, optionally via the facilitator. Optionally, the facilitator validates aspects of the complete refund transaction record (e.g., that complete refund transaction record is signed by both the first party, that the complete refund transaction record has not otherwise been modified, is consistent with the terms and the complete commit transaction record, etc.). If validation fails, the facilitator may reject the complete refund transaction record, optionally with an error message to the first client. Optionally, the facilitator transmits the complete refund transaction record to the second client.

18. Optionally, the second client verifies that the complete refund transaction record is as expected and signed by the first party and the second party, etc.

19. After creating or receiving both the complete commit transaction record and the complete refund transaction record, the first client submits the first source transaction record to the transfer mechanism for effecting the first source transaction.

20. After creating or receiving both the complete commit transaction and the complete refund transaction, the second client submits the second source transaction record to the transfer mechanism for effecting the second source transaction.

21. After seeing that both the first source transaction and second source transaction have been submitted to the transfer mechanism, one or both of the first client the second client submit the complete commit transaction record for effecting the commit transaction.

22. On or after the expiration timestamp or at a time or upon an event as defined by the terms, and before the lock time of the complete refund transaction record, the facilitator performs a calculation in accordance with the terms for determining a first disbursement amount and a second disbursement amount, optionally requesting information from one or more data sources for use in the calculation (e.g., the most recent price of a publicly traded financial instrument, the price of the instrument at the time the offer was accepted, etc.). In one embodiment, the data source comprises an external data feed, internal database, another data source, etc.

In the example embodiment, given a time t, the data source provides the value at t of one or more of: the base instrument, the quote instrument, the base instrument in terms of the denominating asset $b_t$, the quote instrument in terms of the denominating asset $q_t$, or the base instrument in terms of the quote instrument (e.g., if the base instrument or the quote instrument is also the denominating asset).

In continuing the example above, the base instrument is USD, the quote instrument is AUD, and the denominating asset is BTC. $b_0$ is the value of USD in BTC at the time the trade is initiated. $b_f$ is the value of USD in BTC at the time the trade is completed. $q_0$ is the value of AUD in BTC at the time the trade is initiated. $q_f$ is the value of AUD in BTC at the time the trade is completed. The calculation the facilitator uses to compute the first disbursement amount and the second disbursement amount comprises $res_{base}$ ($b_0$, $q_0$, $b_f$, $q_f$). In typical embodiments, a party's loss is proportionate to its counterparty's gain, implying:

$$res_{quote}(q_0, b_0, q_f, b_f) = res_{base}(b_0, q_0, b_f, q_f) \quad [\text{eq. 2}]$$

23. The facilitator signs an inchoate disbursement transaction record, which comprises:

a. an input for receiving the commit amount from the commit transaction;

b. a first disbursement output comprising the first disbursement amount and a first condition requiring approval of the first party;

c. a second disbursement output comprising the second disbursement amount and a condition requiring approval of the second party; and d. optionally a third disbursement output comprising a fee amount and a condition requiring approval of a third party;

typically where the sum of the first disbursement amount, the second disbursement amount, and any fee amount is not more than the commit amount from the complete commit transaction.

Example Inchoate Disbursement Transaction Record:

```
Input:
    Previous tx: 6b24...b607
    Index: 0
    scriptSig: OP_0 [sig. placeholder]ddbb...b00601
Output:
    Value: 142500736
    scriptPubKey: OP_DUP OP_HASH160 53a5...8974
    OP_EQUALVERIFY
    OP_CHECKSIG
Output:
    Value: 157479264
    scriptPubKey: OP_DUP OP_HASH160 30e6...2511
    OP_EQUALVERIFY
    OP_CHECKSIG
Output:
    Value: 10000
    scriptPubKey: OP_DUP OP_HASH160 d377...5c8c
    OP_EQUALVERIFY
    OP_CHECKSIG
...
```

24. The facilitator transmits the inchoate disbursement transaction record to both the first client and the second client, either of whom may independently verify, sign, and submit the disbursement transaction record to the transfer mechanism before the time arrives that the other can successfully submit the complete refund transaction record.

The above is but one embodiment of a vale transfer according to the invention. In another, equivalent or alternate steps may be used. The following describes an embodiment comprising an atypical, but illustrative arrangement:

1. A first client transmits an offer to a second client.

2. The first client transmits the offer to a facilitator.

3. The facilitator transmits to the first client a first inchoate commit transaction record for creating a complete commit transaction record, the first inchoate commit transaction record comprising:

a. a first principal input for receiving a first principal amount from a first source transaction; and [0139] b. a first commit output comprising a first commit amount and a condition requiring approval of two of:

i. a first party;

ii. a second party; and iii. the facilitator.

4. The facilitator transmits to the second client a second inchoate commit transaction record for creating the complete commit transaction record, the second inchoate commit transaction record comprising:

a. a second principal input for receiving a second principal amount from a second source transaction; and b. a second commit output comprising a second commit amount and a condition requiring approval of two of:

i. the first party;

ii. the second party; and iii. the facilitator.

5. The first client signs a first source transaction record.

6. The first client completes and signs (e.g., with SIGHASH_SINGLE|SIGHASH_ANYONECANPAY) the first inchoate commit transaction record.

Example First Inchoate Commit Transaction Record:

```
...
Input:
    Previous tx: 85e5...e61f
    Index: 1
    scriptSig: 5e7c...a11a83 ecad...d0ba
...
Output:
    Value: 150000000
    scriptPubKey: 2 67c1...4a70 bf9a...f9e3 cffd...1373 3
    OP_CHECKMULTISIG
```

7. The first client transmits the first inchoate commit transaction record to the facilitator.

8. The second client signs a second source transaction record.

9. The second client completes and signs (e.g., with SIGHASH_SINGLE|SIGHASH_ANYONECANPAY) the second inchoate commit transaction record.

Example Second Inchoate Commit Transaction Record:

```
...
Input:
    Previous tx: 705d...9ce2
    Index: 0
    scriptSig: ade1...9dcb83 f058.. .878a
...
Output:
    Value: 150000000
    scriptPubKey: 2 67c1...4a70 bf9a...f9e3 cffd...1373 3
    OP_CHECKMULTISIG
...
```

10. The second client transmits the second inchoate commit transaction record to the facilitator. [0157] 11. The facilitator creates the complete commit transaction record from the first inchoate transaction record and the second inchoate commit transaction record, the complete commit transaction record comprising:

a. a first principal input for receiving a first principal amount from the first source transaction; and b. a first commit output comprising a first commit amount and a condition requiring approval of two of:
   i. the first party;
   ii. the second party; and
   iii. the facilitator;

c. a second principal input for receiving a second principal amount from the second source transaction; and d. a second commit output comprising a second commit amount and a condition requiring approval of two of:
   i. the first party;
   ii. the second party; and
   iii. the facilitator.

Example Complete Commit Transaction Record:

```
ID: 11f0...8ea8
Input:
    Previous tx: 85e5...e61f
    Index: 1
    scriptSig: 5e7c...a11a83 ecad...d0ba
Input:
    Previous tx: 705d...9ce2
    Index: 0
    scriptSig: ade1...9dcb83 f058.. .878a
...
Output:
    Value: 150000000
    scriptPubKey: 2 67c1...4a70 bf9a...f9e3 cffd...1373 3
    OP_CHECKMULTISIG
Output:
    Value: 150000000
    scriptPubKey: 2 67c1...4a70 bf9a...f9e3 cffd...1373 3
    OP_CHECKMULTISIG
...
```

In another embodiment, the first client provides a transaction ID of the first source transaction record to the facilitator and the second client provides a transaction ID of the second source transaction record to the facilitator before the facilitator transmits the first inchoate commit transaction record and the second inchoate commit transaction record. The facilitator creates the first inchoate commit transaction record identical to the second inchoate commit transaction record, each comprising a first principal input with a placeholder signature and a second principal input with a placeholder signature. Once the respective inchoate commit transaction records are transmitted to the respective clients, the clients each sign their respective principal input (e.g., with SIGHASH_ALL|SIGHASH_ANYONECANPAY) before returning their respective signed inchoate commit transaction record back to the facilitator. The facilitator collects the signed inchoate commit transaction records and consolidates the signed inputs into a complete commit transaction record. In such an embodiment, the first commit output and the second commit output could be consolidated, and the corresponding disbursement transaction record and refund transaction record could omit their respective second inputs.

12. The facilitator transmits the completed commit transaction record to the first client who optionally stores it in non-transitory memory.

13. The facilitator transmits the completed commit transaction record to the second client who optionally stores it in non-transitory memory.

14. The first client signs (e.g., SIGHASH_ALL|SIGHASH_ANYONECANPAY Or SIGHASH_SINGLE|SIGHASH_ANYONECANPAY) an inchoate refund transaction record comprising:

a. a lock time after the expiration timestamp;

b. a first input for receiving the first commit amount from a commit transaction;

c. a second input for receiving the second commit amount from the commit transaction;

d. a first refund output comprising a first refund amount and a first condition requiring approval of the first party; and e. a second refund output comprising a second refund amount and a second condition requiring approval of the second party.

Example Inchoate Refund Transaction Record:

```
...
Input:
    Previous tx: 11f0...8ea8
    Index: 0
    scriptSig: OP_0 78a2...203181 [sig. placeholder]
Input:
    Previous tx: 11f0...8ea8
    Index: 1
    scriptSig: OP_0 fdbe...893f81 [sig. placeholder]
...
```

```
Output:
    Value: 149995000
    scriptPubKey: OP_DUP OP_HASH160 53a5...8974
    OP_EQUALVERIFY
    OP_CHECKSIG
Output:
    Value: 149995000
    scriptPubKey: OP_DUP OP_HASH160 30e6...2511
    OP_EQUALVERIFY
    OP_CHECKSIG
nLockTime: 2014-06-03T12:34:56Z
```

15. The first client transmits the complete commit transaction record and the inchoate refund transaction record to the second client 16. The second client creates the complete refund transaction record from the inchoate refund transaction record (e.g., signing with SIGHASH_ALL|SIGHASH_ANYONECANPAY or SIGHASH_SINGLE|SIGHASH_ANYONECANPAY) and saves a copy in non-transitory memory.

Example Complete Refund Transaction Record:

```
ID: eb09...3d15
Input:
    Previous tx: 11f0...8ea8
    Index: 0
    scriptSig: OP_0 78a2...203181 b765...fc4383
Input:
    Previous tx: 11f0...8ea8
    Index: 1
    scriptSig: OP_0 fdbe...893f81 91e4...4dd583
...
Output:
    Value: 149995000
    scriptPubKey: OP_DUP OP_HASH160 53a5...8974
    OP_EQUALVERIFY
    OP_CHECKSIG
Output:
    Value: 149995000
    scriptPubKey: OP_DUP OP_HASH160 30e6...2511
    OP_EQUALVERIFY
    OP_CHECKSIG
...
nLockTime: 2014-06-03T12:34:56Z
```

17. The second client transmits the complete refund transaction record to the first client.

18. After creating or receiving both the complete commit transaction record and the complete refund transaction record, the first client submits the first source transaction record to the transfer mechanism.

19. After creating or receiving both the complete commit transaction record and the complete refund transaction record, the second client submits the second source transaction record to the transfer mechanism.

20. After seeing that both the first source transaction record and second source transaction record have been submitted, one or both of the first client the second client submits the complete commit transaction record.

21. On or after the expiration timestamp, or at a time or upon an event as defined by the terms, and before the lock time of the complete refund transaction record, the facilitator performs a calculation in accordance with the terms for determining a first disbursement amount and a second disbursement amount, optionally requesting information from one or more data sources for use in the calculation.

22. The facilitator signs an inchoate disbursement transaction record (e.g., signing with SIGHASH_ALL|SIGHASH_ANYONECANPAY Or SIGHASH_SINGLE|SIGHASH_ANYONECANPAY).

Example Inchoate Disbursement Transaction Record:

```
Input:
    Previous tx: 11f0...8ea8
    Index: 0
    scriptSig: OP_0 [sig. placeholder]8cd3...d86481
Input:
    Previous tx: 11f0...8ea8
    Index: 1
    scriptSig: OP_0 [sig. placeholder]12bc...825281
...
Output:
    Value: 142500736
    scriptPubKey: OP_DUP OP_HASH160 53a5...8974
    OP_EQUALVERIFY
    OP_CHECKSIG
Output:
    Value: 157479264
    scriptPubKey: OP_DUP OP_HASH160 30e6...2511
    OP_EQUALVERIFY
    OP_CHECKSIG
Output:
    Value: 10000
    scriptPubKey: OP_DUP OP_HASH160 d377...5c8c
    OP_EQUALVERIFY
    OP_CHECKSIG
...
```

23. The facilitator transmits the inchoate disbursement transaction record to both the first client and the second client, either of whom can submit it as in the prior example embodiment.

Various verification steps have been omitted for brevity.

It will become apparent to one skilled in the art that aspects of each of embodiments above may be commingled. For example, the first client could transmit the offer to the facilitator, where the second client could find and retrieve it. As mentioned above, aspects of one or both of the first client and the second client could coincide with the facilitator allowing many of the above steps to be omitted as redundant where the facilitator is entrusted to act as a proxy for or on behalf of one of the first party and the second party. The facilitator could contain aspects of one of the clients, but not the other, in which case the extra-facilitator client would optionally independently validate transaction records it received from the facilitator before signing them, etc. In such embodiments, the facilitator typically comprises a means to control aspects of a client it comprises via an interface such as a web-based user interface (UI), an application programmer's interface (API), etc.

In such embodiments, any party delegating authority to the facilitator must trust the facilitator to be secure and to act fairly, but these are similar to expectations many parties already have of traditional third party intermediaries. Assuming the first party has independent access to same key pairs the facilitator uses to act on behalf of the first party, and the second party has independent access to the same key pairs the facilitator uses to act on behalf of the second party, even if the facilitator is destroyed, both the first party and the second party may retrieve their assets, at worst by submitting any complete refund transaction record to the transfer mechanism on or after the lock time, assuming they have kept copies of the complete refund transaction record in their respective non-transitory memories.

In one embodiment, a client is configured such that when it detects a new spendable output comprising an amount (e.g., by monitoring changes in or updates to the block chain when using the Bitcoin or similar protocol as the transfer mechanism), it automatically accepts a remote offer comprising an amount compatible with the amount of the new spendable output. If no such remote offer is available, it transmits an offer comprising an amount substantially similar to the new spendable output (e.g., to the facilitator, to another client, etc.). In another embodiment, when the client detects a second new spendable output, it attempts to rescind the offer. If successful, it transmits a new offer comprising an amount which comprises some or all of the new spendable output and some or all of the second new spendable output. Other variations are possible. For example, the client could be configured to scan available offers and match the available offers to the amounts of the spendable outputs. Matching algorithms vary in complexity and are known in the art. For example, many Bitcoin protocol client implementations provide such algorithms for matching spendable outputs to the inputs of simple transactions. Such algorithms are adaptable by those of ordinary skill in the art for this and similar embodiments of the invention.

In various embodiments, the terms comprise a ratio of a first instrument to a second instrument, optionally denominated in an asset, as well as an amount that each participant must allocate. For example, in one embodiment, the terms could offer to "sell" 2 BTC/USD with a required allocation of 3 BTC from each party. In other words, the swap defined by the terms offers exposure to 2 BTC of USD, and each participant must allocate 2 BTC to principal and 1 BTC to collateral for the duration of the swap (i.e., until it expires, or until the principal and collateral of one party is exhausted).

The allocations for each party need not be equal. In one embodiment, if the market expects a particular instrument pair to decline over the life of the swap, the party accepting exposure to that instrument pair may be required to allocate more collateral than the counterparty. Note that in the previous example, the parties' risk formulas are asymmetric. The most the offeror could lose is the principal of 2 BTC (if BTC become worthless when valued in USD). However, the offeree's losses are unbounded (if USD becomes worthless when valued in BTC). In other words:

$$res_{base}(b_o, q_o, b_f, q_f) = \text{principal} \times \frac{b_f - b_o}{q_f - q_o} \qquad [\text{eq. 3}]$$

Alternately:

$$res_{base}(b_o, q_o, b_f, q_f) = \text{principal} \times \left(\frac{b_f}{q_f} - \frac{b_o}{q_o}\right) \qquad [\text{eq. 4}]$$

In other embodiments symmetrical models could be adopted. Consider:

$$res_{base}(b_o, q_o, b_f, q_f) = \begin{cases} \frac{b_i}{q_f} \leq \frac{b_o}{q_o} : & \text{principal} \times \left(\frac{b_f q_o}{b_o q_f} - 1\right) \\ \frac{b_i}{q_f} > \frac{b_o}{q_o} : & \text{principal} \times \left(1 - \frac{b_o q_f}{b_f q_o}\right) \end{cases} \qquad [\text{eq. 5}]$$

Where $res_{base}(\ldots)$ is the resulting gain or loss to the party taking the base instrument exposure at time f given the initial value of the base instrument $b_0$, the initial value of the quote instrument $q_0$, the value of the base instrument $b_f$ at time f, and the value of the quote instrument $q_f$ at time f. The resulting gain or loss for the party taking the quote instrument exposure is inverted:

$$res_{quote}(b_o, q_o, b_f, q_f) = \qquad [\text{eq. 6}]$$
$$-res_{base}(b_o, q_o, b_f, q_f) = \begin{cases} \frac{b_f}{q_f} \leq \frac{b_o}{q_o} : & \text{principal} \times \left(1 - \frac{b_f q_o}{b_o q_f}\right) \\ \frac{b_f}{q_f} > \frac{b_o}{q_o} : & \text{principal} \times \left(\frac{b_o q_f}{b_f q_o} - 1\right) \end{cases}$$

In this embodiment, the parties' risk formulas are symmetric. If the base instrument goes to zero, the most the party taking the base instrument exposure can lose is the principal. Likewise, if the quote instrument goes to zero, the most the party taking the quote instrument exposure can lose is the principal. Note that no collateral is needed. Alternately, consider.

$$res_{base}(b_o, q_o, b_f, q_f) = \qquad [\text{eq. 7}]$$
$$-res_{quote}(b_o, q_o, b_f, q_f) = \begin{cases} \frac{b_f}{q_f} \leq \frac{b_o}{q_o} : & -\text{principal} \times \frac{b_o q_f}{b_f q_o} \\ \frac{b_f}{q_f} > \frac{b_o}{q_o} : & \text{principal} \times \frac{b_f q_o}{b_o q_f} \end{cases}$$

In this embodiment, the parties' risk formulas are also symmetric. However, as the base instrument goes to zero, the loss incurred by the party taking the base instrument approaches infinity, all else being equal. Likewise, as the quote instrument goes to zero, the loss incurred by the party taking the quote instrument position approaches infinity, all else being equal. Note that collateral is needed when losses exceed principal amounts. The more volatile the instrument pair, the more collateral may be required to minimize risk of termination before expiration. These are but a few basic examples. Terms affecting the calculation for determining the allocation disbursement amounts can be arbitrarily complex and are limited by the imaginations of the participants. All such variations are contemplated by the invention.

Figure 6:
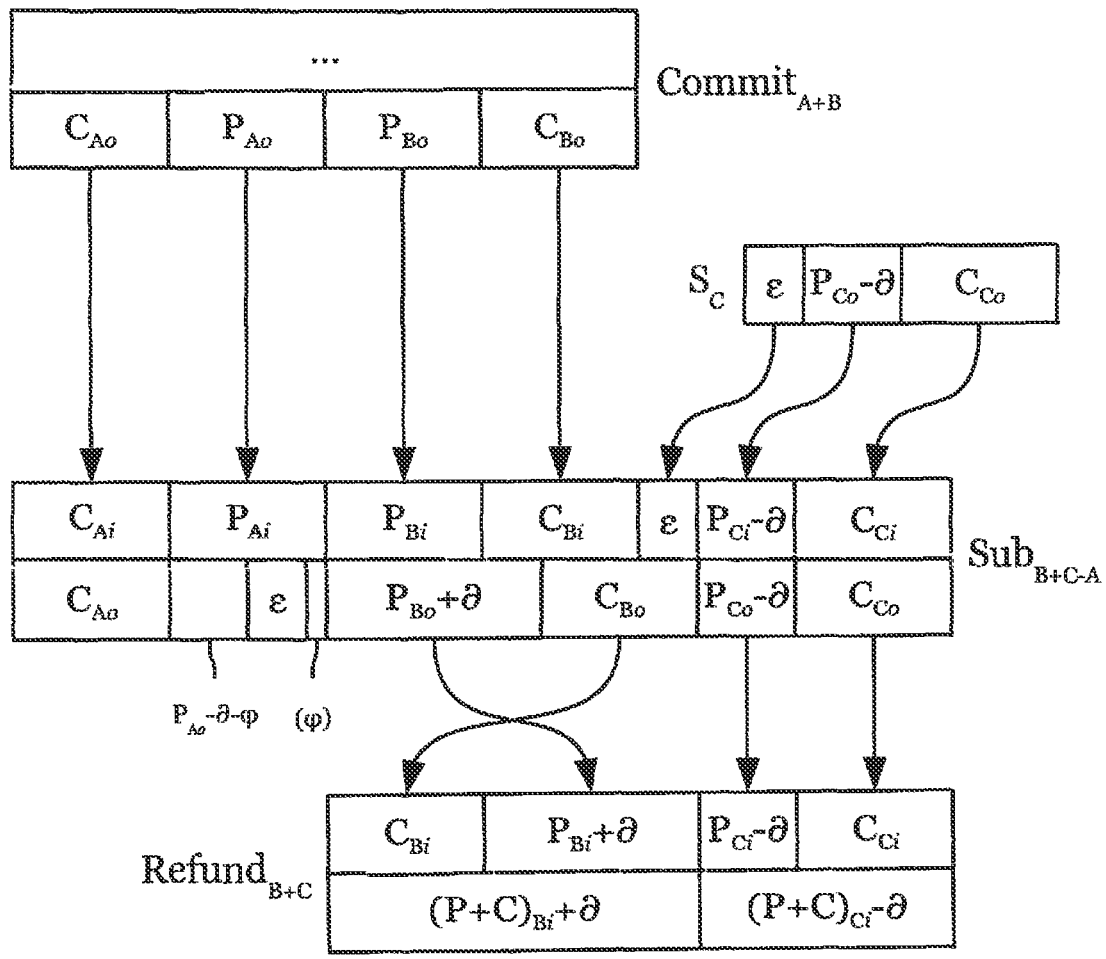
FIGS. 6-7 depict transaction chains from various example swap embodiments where one party wishes to exit before termination, and cannot secure an agreement from the counterparty, but is able to find a third party willing to stand in place of the party wishing to exit.
Figure 7:
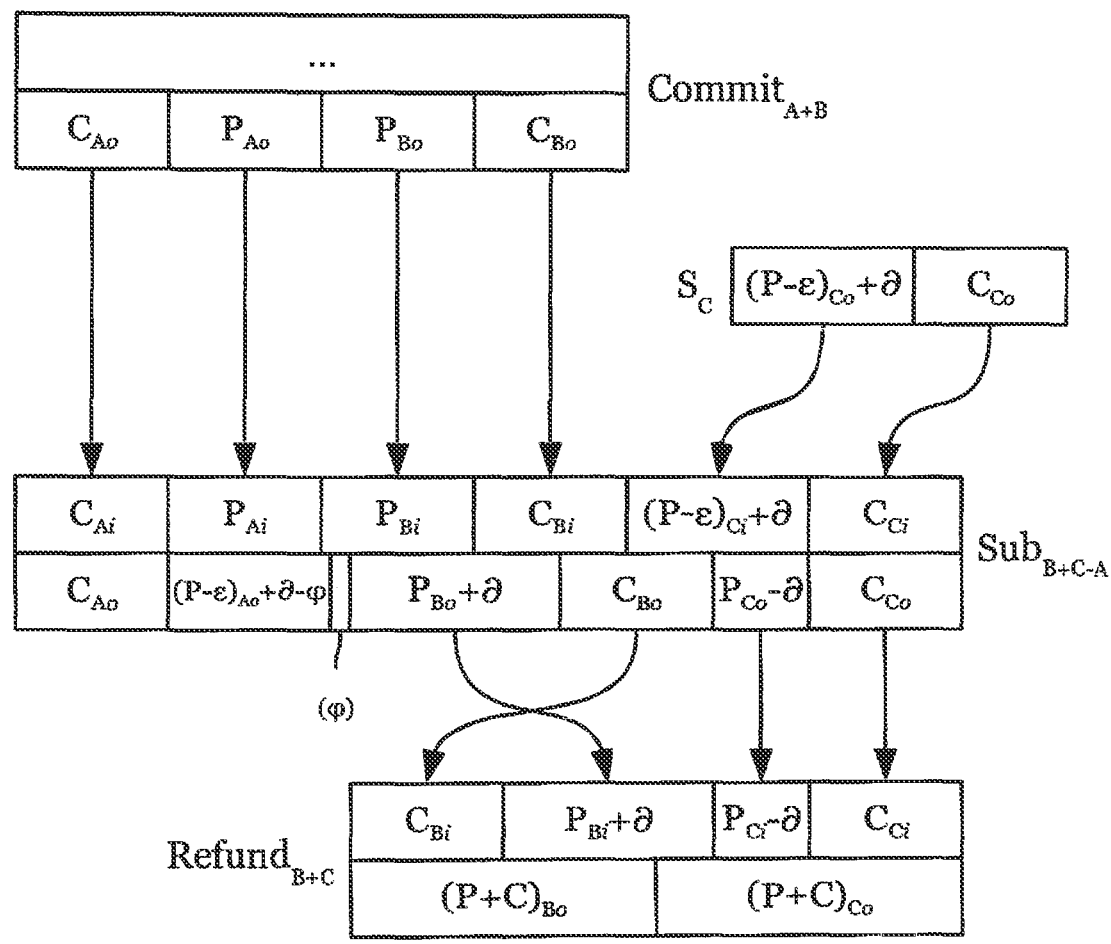

In some circumstances, a party may wish to exit a value transfer (e.g., a swap) before it expires. The parties may agree to terminate prematurely. In one embodiment, the facilitator facilitates this by creating the inchoate disbursement transaction record as if the swap had expired when the parties agreed to exit. The requesting party signs the inchoate disbursement transaction record and transmits it to the acquiescing party who signs and submits it to the transfer mechanism. Optionally, if the facilitator includes a fee output to a third party, the acquiescing party may require that the fee would be born disproportionately, or entirely by the requesting party.

Where one party wishes to exit before termination, but cannot secure an agreement from the counterparty, another option is for the party seeking premature termination to find a third party substitute. FIGS. 6-7 depict transaction chains from various example swap embodiments comprising such substitutions.

FIG. 6 depicts aspects of an embodiment where a withdrawing party (A) has convinced an entering party (C) to substitute into a value transfer with a remaining party (B). In addition, the entering party transfers a negotiated amount (c) to the withdrawing party. This is facilitated in the depicted embodiment by a substitution transaction, a second commit transaction, and a second refund transaction.

For clarity of illustration, the outputs of the commit transaction and the corresponding inputs of the substitution transaction are depicted as separate for each of the first principal ($P_A$), the first collateral ($C_A$), the second principal ($P_B$), and the second collateral ($C_B$). This is not a limitation of the invention. Just as with the previously described embodiments, the outputs of the commit transaction, and corresponding inputs of the substitution transaction could be any configuration considered valid by the transfer mechanism. The outputs of the substitution transaction and inputs to the second commit transaction are similarly depicted for clarity of illustration. Again, all valid configurations of inputs and outputs between transactions are contemplated by the invention.

A difference (∂) used to calculate the first disbursement amount and the second disbursement amount as if the transaction had expired at the time of the substitution. In the embodiment depicted in FIG. 6, this favors the remaining party. Therefore, the substitution transaction record is constructed such that the withdrawing party takes a loss in proportion to that difference, and the entering party need only provide assets to cover the remaining position.

Also, in the embodiment depicted in FIG. 6, the substitute refund is asymmetric. The entering party is refunded what that party committed to the transaction (less the negotiated amount), and the remaining party is refunded what that party would have received had the swap expired at the time of substitution. Other variations are possible. For example, in one embodiment, the negotiated amount may be transferred separately, at another phase of the value transfer, or in a separate value transfer altogether.

In the embodiment depicted in FIG. 7, the substitution favors the withdrawing party. In that embodiment, the substitute refund is symmetric. The remaining party is refunded what that party would have received had the original transaction been refunded.

In one embodiment, a substitution is facilitated by the following steps:

1. The facilitator performs a calculation in accordance with the terms for determining a withdrawal amount and an entry amount, optionally requesting information from one or more data sources for use in the calculation.

2. The facilitator creates an inchoate substitution transaction record comprising:
   a. a first input for receiving an amount from a commit transaction;
   b. an entry input for receiving the entry amount from a source transaction;
   c. a withdrawal output comprising the withdrawal amount and a first condition requiring approval of the first party; and
   d. a substitution output comprising a substitution amount and a second condition requiring approval of two of:
   i. the second party;
   ii. the third party; and
   iii. the facilitator.

Example Inchoate Substitution Transaction Record:

```
Input:
    Previous tx: 6b24. .b607
    Index: 0
    scriptSig: OP_0 [sig. placeholder][sig. placeholder]
Input:
    Previous tx: dd66...ae8e
    Index: 3
    scriptSig: [sig. placeholder]
Output:
    Value: 300000000
    scriptPubKey: 2 bf9a...f9e3 952b...0542 cffd...1373 3
    OP_CHECKMULTISIG
```

```
-continued

Output:
    Value: 121871000
    scriptPubKey: OP_DUP OP_HASH160 6250...6cfc
    OP_EQUALVERIFY
    OP_CHECKSIG
...
```

3. The facilitator transmits the inchoate substitution transaction record to the first party and the third party.

4. The first party creates a first signed inchoate substitution transaction record by signing the first input of inchoate substitution transaction record (e.g., signing with SIGHASH_ALL|SIGHASH_ANYONECANPAY) and transmits the first signed inchoate substitution transaction record to the facilitator.

5. The third party creates a second signed inchoate substitution transaction record by signing the entry input of the inchoate substitution transaction record (e.g., signing with SIGHASH_ALL|SIGHASH_ANYONECANPAY) and transmits the second signed inchoate substitution transaction record to the facilitator.

6. The facilitator creates a complete substitution transaction record (e.g., ID: 9c8b . . . 4794) from the first inchoate substitution transaction record and the second inchoate substitution transaction record.

7. The facilitator signs an inchoate substitute refund transaction record comprising:
   a. a lock time after the expiration timestamp;
   b. an input for receiving the substitution amount from a substitution transaction;
   c. a first refund output comprising a first refund amount and a first condition requiring approval of the second party; and
   d. a second refund output comprising a second refund amount and a condition requiring approval of the third party.

Example Inchoate Substitute Refund Transaction Record:

```
Input:
    Previous tx: 9c8b...4794
    Index: 0
    scriptSig: OP_0 [sig. placeholder]b2ac...8a4601
Output:
    Value: 178124000
    scriptPubKey: OP_DUP OP_HASH160 30e6...2511
    OP_EQUALVERIFY
    OP_CHECKSIG
Output:
    Value: 121866000
    scriptPubKey: OP_DUP OP_HASH160 94e2...4fb6
    OP_EQUALVERIFY
    OP_CHECKSIG
...
nLockTime: 2014-06-03T12:34:56Z
```

8. The facilitator creates a signed substitute refund transaction record by signing the inchoate substitute refund transaction record and transmits the signed substitute refund transaction record to the second party and the third party.

9. The facilitator submits the complete substitution transaction record to the transfer mechanism.

Various verification and details steps disclosed in previous embodiments have been omitted for brevity. In other embodiments, the various transaction records are created or signed by the first party or the second party instead of the facilitator. For example, the first party and the second party could agree upon the amounts in the substitution transaction record, and each could sign it without involving the facilitator. All such variations are considered part of the invention.

A letter of credit (L/C) is well known in the art, but is fundamentally an agreement where a third party transfers assets to a second party on behalf of a first party upon some agreed upon condition being demonstrated as met before an agreed upon time (an expiration). Typically, this comprises an expensive manual review of arcane shipping documents by an intermediary financial institution before it will release funds on behalf of a buyer. However this costly approach can be eschewed in favor of one embodiment of the invention in which the facilitator conditions the creation and transmission of a disbursement transaction record based on the result from a query to a shipper's public API regarding a known tracking number. In other embodiments, L/C terms comprise evaluating search results, observation of the presence or absence of data at an anticipated location, checking that the value of a variable or response from an API is within a set of expected values or matches an anticipated pattern, receiving a signal from a digital instrument (e.g., a temperature sensor, a GPS, etc.) and validating that a signal value is within an anticipated range or tolerance, etc. The possibilities are many and varied. For example, U.S. continuation application Ser. No. 13/970,755 ('755) describes systems and methods for efficiently calculating geospatial nearness. Others are known in the art. In one embodiment, the calculation comprises a condition whereupon an object is or was "at" or "near" (i.e., within a specified distance of) a particular location. Mechanisms to discover the location of said object are known in the art (e.g., self-reporting GPSs, Automatic Identification and Data Capture (AIDC) devices, such as barcodes, Quick Response (QR) Codes, Radio Frequency Identification (RFID) tags, in proximity of a reporting detector or sensor at a known location, etc.). Many possible configurations are contemplated by the invention, and will become apparent to one skilled in the art.

Figure 8:
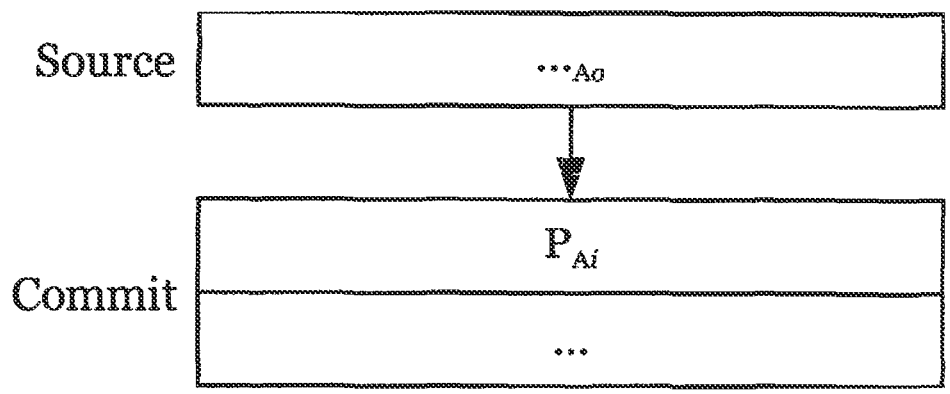
FIG. 8 depicts aspects of one embodiment pertaining to a L/C comprising a source transaction and a commit transaction.

FIG. 8 depicts aspects of one embodiment pertaining to a L/C comprising a source transaction and a commit transaction. As depicted, the commit transaction comprises a first input for accepting a first amount from a first source transaction (i.e., from a first party), and one or more outputs for directing a portion of the first amount to one or more other transactions (not depicted). In other embodiments, portions of which are depicted in other figures, the commit transaction further comprises a second input for accepting a second amount from a second source transaction (i.e., from a second party), where the first amount and second amount total an expected amount. In some cases the amounts comprise a principal amount (P), and (optionally) a collateral amount (C), as depicted in the various figures. While only a first source transaction is depicted in FIG. 8, that should not be construed as a limitation of the invention.

Figure 9:
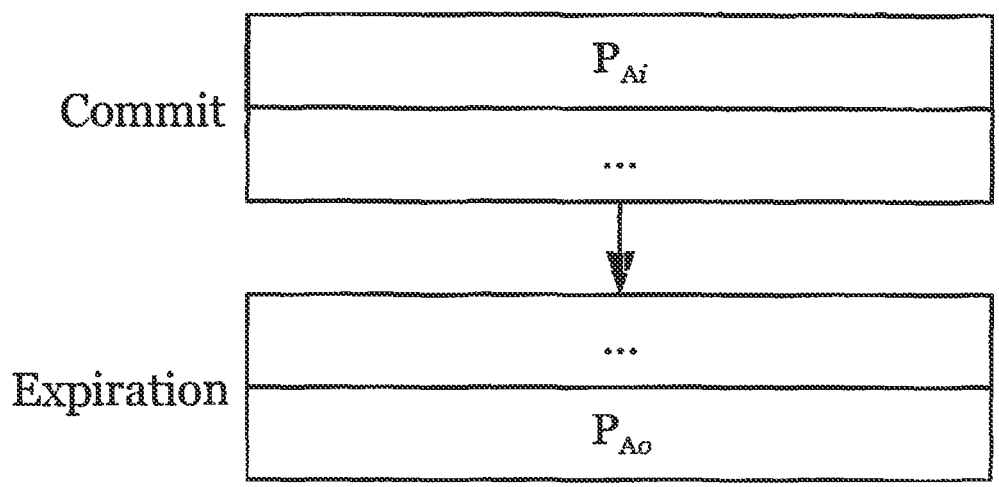
FIG. 9 depicts aspects of one embodiment pertaining to a L/C comprising a commit transaction and an expiration transaction.

FIG. 9 depicts aspects of one embodiment pertaining to a L/C comprising a commit transaction and an expiration transaction, the expiration transaction being analogous to the refund transaction in previously described embodiments. However, where a refund transaction is meant exclusively for recovery of funds in the event of an exception (e.g., the facilitator becomes unavailable to create or sign a disbursement transaction record), use of an expiration transaction, in addition to recovery, is contemplated by the offer (e.g., if the conditions set forth are not satisfied before the expiration timestamp, despite the facilitator being operational). The difference is largely conceptual. The two function almost identically within the invention. The commit transaction comprises a first input for receiving a first principal amount ($P_A$), and a commit output. The expiration transaction comprises an input for receiving an amount from the commit output, a first expiration output to the first party. In other embodiments where the commit transaction comprises a second input for receiving a second amount, the expiration transaction comprises a second expiration output to the second party.

Figure 10:
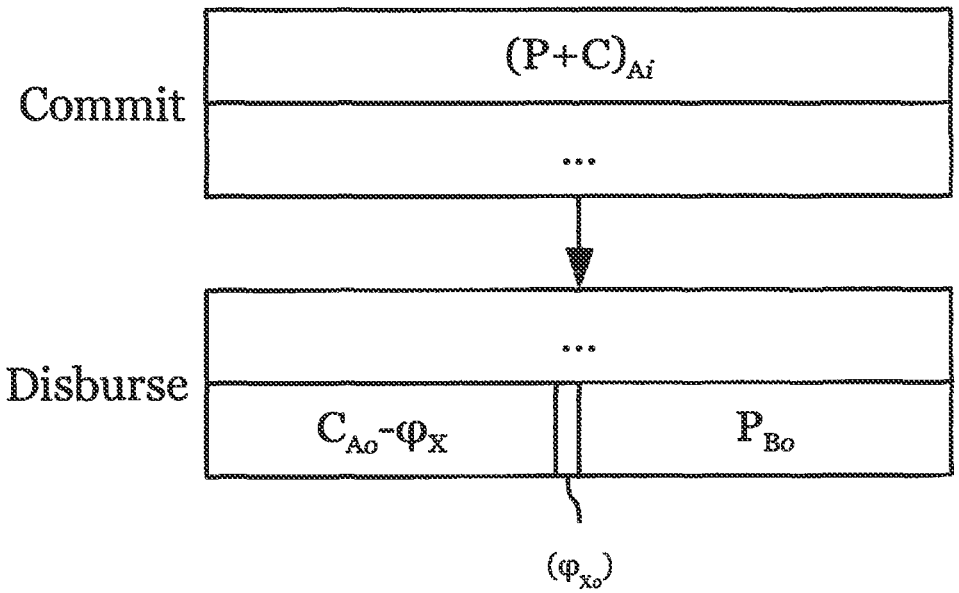
FIGS. 10-11 depict aspects of L/C embodiments comprising relatively simple disbursement transactions in a situation involving principal and collateral.
Figure 11:
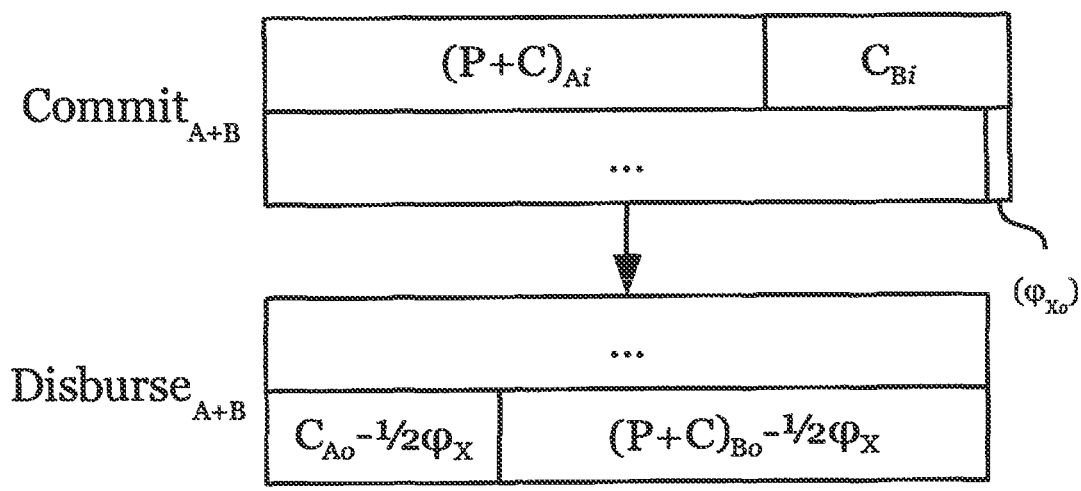

FIGS. 10-11 depict aspects of L/C embodiments comprising relatively simple disbursement transactions in a situation involving principal and collateral. In FIG. 10, the commit transaction comprises a first joined principal and collateral (($P+C)_A$) input from a first party. In other embodiments, just as with those mentioned above, the inputs need not be joined. In FIG. 11, the commit transaction comprises a first joined principal and collateral input from a first party, and a second collateral ($C_B$) input from the second party. These are but two of many possible configurations contemplated by the invention. For example, a commit transaction could comprise a principal input from a first party, a collateral input from a third party (e.g., a guarantor of the first party, not depicted), and a collateral input from a second party.

In the embodiments depicted in FIGS. 10-11, each of the disbursement transactions comprises an input for receiving an amount from the commit output. In FIG. 10, the disbursement transaction comprises a first collateral disbursement output to the first party, a first principal disbursement output to the second party, and an optional fee ((p) output to a third party, where the fee is deducted from the collateral. In FIG. 11, the disbursement transaction comprises a collateral disbursement output to the first party, and a joined principal and collateral disbursement output to the second party. In addition, the commit transaction comprises an optional fee output to a third party, which is born equally by the parties in the disbursement transaction. Again, these are but two of many possible configurations contemplated by the invention. For example, the optional fee output could be allocated at any stage, or multiple stages. It could be born solely or disproportionately by one party at the same or different stages.

To illustrate by way of example how some of the various components above may be used together to facilitate various L/C agreements, the following steps occur in one embodiment using the Bitcoin or similar protocol as the transfer mechanism, where the parties do not trust each other, and the facilitator is not fully trusted by any of the parties:

1. A first client creates an offer, the offer comprising terms, the terms comprising:
   a. one of a disbursement condition comprising one or more references to a data source, a reference to a disbursement condition comprising one or more references to a data source, a disbursement function comprising one or more references to a data source, and one or more references to a disbursement function comprising one or more reference to a data source;
   b. a principal amount;
   c. an expiration timestamp;
   d. optionally, a first collateral amount; and
   e. optionally, a second collateral amount.
   Example Terms:
   Payer principal: 0.5 (BTC)
   Payer collateral: 1×principal
   Payee collateral: 0.05×principal
   Disbursement condition:
   FedEx("987654321").deliveredToCarrier( )==true
   Expiration: 2014-06-01T12:34:56Z 2. The first client signs a first source transaction record.

3. The first client creates an inchoate commit transaction record comprising:
   a. the first input for receiving the first amount from a first source transaction;
   b. optionally, a second input for receiving a second amount from a second source transaction; [0256] c. a commit output comprising a commit amount and a condition requiring approval of two of: [0257] i. a first party;
   ii. a second party; and
   iii. a facilitator.

4. Optionally, the first client transmits the offer to the facilitator, who validates aspects of the offer (e.g., that the facilitator can interpret the terms, that the expiration timestamp is within an acceptable range, etc.). If validation fails, the facilitator may reject the offer, optionally with an error message to the first client.

5. The first client transmits the offer to a second client.

6. Optionally, if the inchoate commit transaction record comprises a second input, the first client transmits the inchoate commit transaction record to the second client. The second client signs a second source transaction record. The second client signs the inchoate commit transaction record. The second client transmits the signed inchoate commit transaction record back to the first client.

7. The first client creates a complete commit transaction record by signing (e.g., with SIGHASH_ALL|SIGHASH_ANYONECANPAY) the inchoate commit transaction record, optionally storing the complete commit transaction record in non-transitory memory.

Example Complete Commit Transaction Record:

```
ID: c215...fc9b
Input:
    Previous tx: 85f7...e06c
    Index: 4
    scriptSig: 186b...ed3d81 9a9c...0fc5
Input:
    Previous tx: 6b03...e16e
    Index: 7
    scriptSig: c48e...353c81 4afe...2c8d
...
Output:
    Value: 150000000
    scriptPubKey: 2 67c1...4a70 bf9a...f9e3 cffd...1373 3
    OP_CHECKMULTISIG
...
```

8. The first client signs an inchoate expiration transaction record comprising:
   a. a lock time on or after the expiration timestamp;
   b. an input for receiving the commit amount from a commit transaction;
   c. a first expiration output comprising a first expiration amount and a first condition requiring approval of the first party; and
   d. optionally, a second expiration output comprising a second expiration amount and a condition requiring approval of the second party.

Example Inchoate Expiration Transaction Record:

```
Input:
    Previous tx: c215...fc9b
    Index: 0
    scriptSig: OP_0 7d17...0b5101 [sig. placeholder]
...
```

```
Output:
    Value: 99995000
    scriptPubKey: OP_DUP OP_HASH160 53a5...8974
    OP_EQUALVERIFY
    OP_CHECKSIG
Output:
    Value: 4995000
    scriptPubKey: OP_DUP OP_HASH160 30e6...2511
    OP_EQUALVERIFY
    OP_CHECKSIG
...
nLockTime: 2014-06-01T12:34:56Z
```

9. The first client transmits the complete commit transaction record and the inchoate expiration transaction record to the second client who optionally stores the complete commit transaction record in non-transitory memory.

10. The second client creates a complete expiration transaction record by signing the inchoate expiration transaction record and stores the complete expiration transaction record in non-transitory memory.

11. The second client transmits the complete expiration transaction record to the first client.

12. After creating or receiving both the complete commit transaction record and the complete expiration transaction record, the first client submits the first source transaction record to the transfer mechanism to effect the first source transaction.

13. After creating or receiving both the complete commit transaction record and the complete expiration transaction record, the second client submits the second source transaction record to the transfer mechanism to effect the second source transaction.

14. After seeing that both the first source transaction record and second source transaction record have been submitted, one or both of the first client the second client submits the complete commit transaction record to the transfer mechanism to effect the commit transaction.

15. At a time or upon an event as defined by the terms or upon a query by the first client or the second client (optionally providing one or more of the complete commit transaction record, a reference to the commit transaction, and the terms), and before the lock time of the complete expiration transaction record, the facilitator performs a calculation in accordance with the terms for determining a first disbursement amount, and optionally a second disbursement amount, optionally requesting information from the data source for use in the calculation (e.g., whether an anticipated shipment has been delivered to a shipper, a destination address, etc., etc.). This could be via an external API, internal database query, etc.

In a typical embodiment, the disbursement amounts are such that any remaining collateral is returned to the respective providing party, and the principal is transferred from the providing party (payer) to the counterparty (payee).

16. The facilitator signs an inchoate disbursement transaction record, which comprises:
   a. an input for receiving the commit amount from the commit transaction;
   b. a first disbursement output comprising the first disbursement amount and a first condition requiring approval of the second party;
   c. optionally, a second disbursement output comprising the second disbursement amount and a condition requiring approval of the first party;

d. optionally a third disbursement output comprising a fee amount and a condition requiring approval of a third party;

typically where the sum of the first disbursement amount, any second disbursement amount, and any fee amount is not more than the commit amount from the commit transaction.

Example Inchoate Disbursement Transaction Record:

```
Input:
    Previous tx: c215...fc9b
    Index: 0
    scriptSig: OP_0 [sig. placeholder]8205...424901
Output:
    Value: 49990000
    scriptPubKey: OP_DUP OP_HASH160 30e6...2511
    OP_EQUALVERIFY
    OP_CHECKSIG
Output:
    Value: 54990000
    scriptPubKey: OP_DUP OP_HASH160 6250...6cfc
    OP_EQUALVERIFY
    OP_CHECKSIG
Output:
    Value: 10000
    scriptPubKey: OP_DUP OP_HASH160 d377...5c8c
    OP_EQUALVERIFY
    OP_CHECKSIG
...
```

17. The facilitator transmits the inchoate disbursement transaction record to both the first client and the second client, either of whom can sign and submit it to the transfer mechanism as in the prior example embodiments.

In another embodiment, the condition of the commit output requires approval of either the first party and the second party or the second party and one or more service providers, (e.g., a shipper, insurance provider, inspector, etc.). An inchoate disbursement transaction record is constructed with placeholders for the second party, and each of the service providers. When all of the service providers have signed their respective portions, the second party may sign and submit the disbursement transaction record to the transfer mechanism. In a further embodiment, the second party commits assets to the commit transaction for paying each of the service providers, and each of the service providers are paid out of the disbursement transaction.

Figure 12:
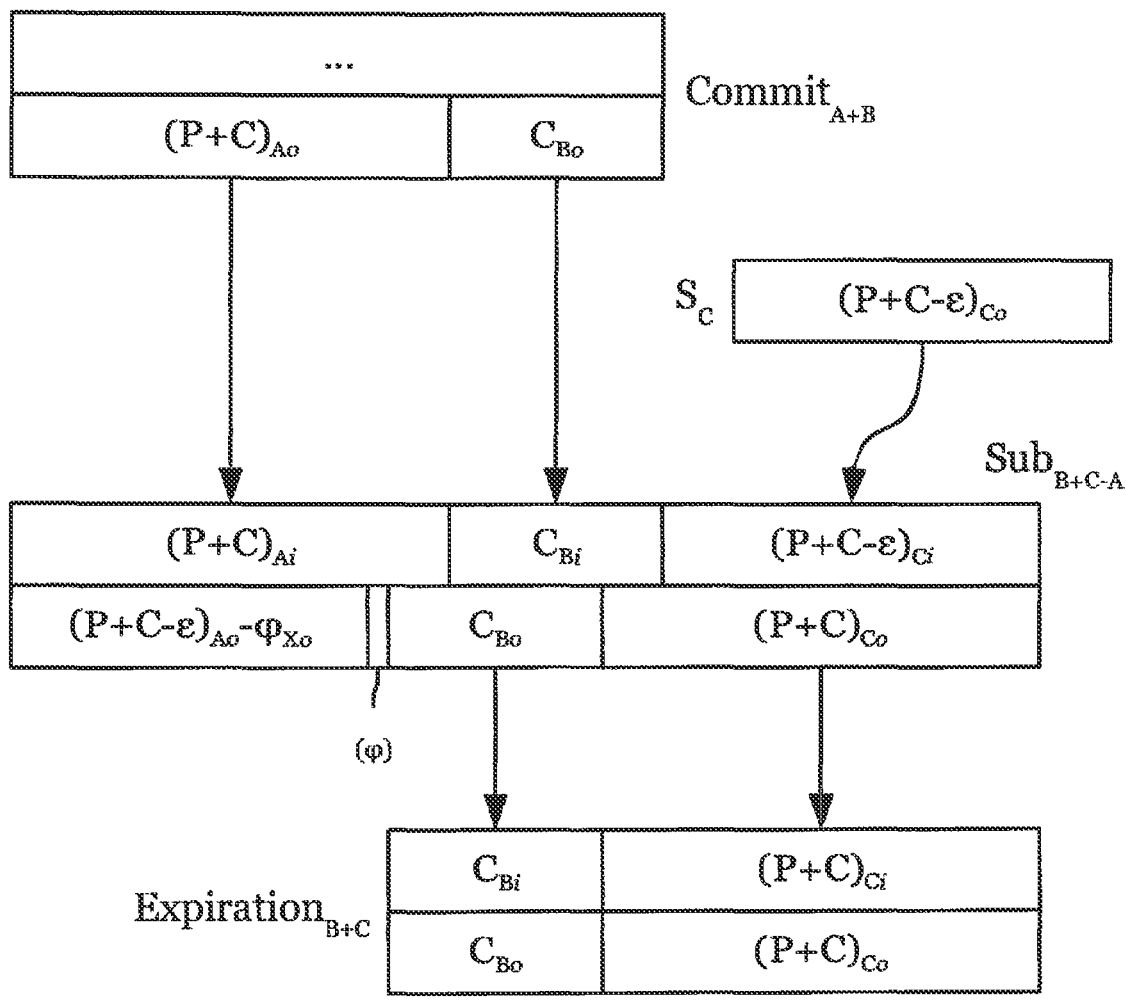
FIGS. 12-14 depict transaction chains from various example L/C embodiments comprising substitutions of parties.
Figure 13:
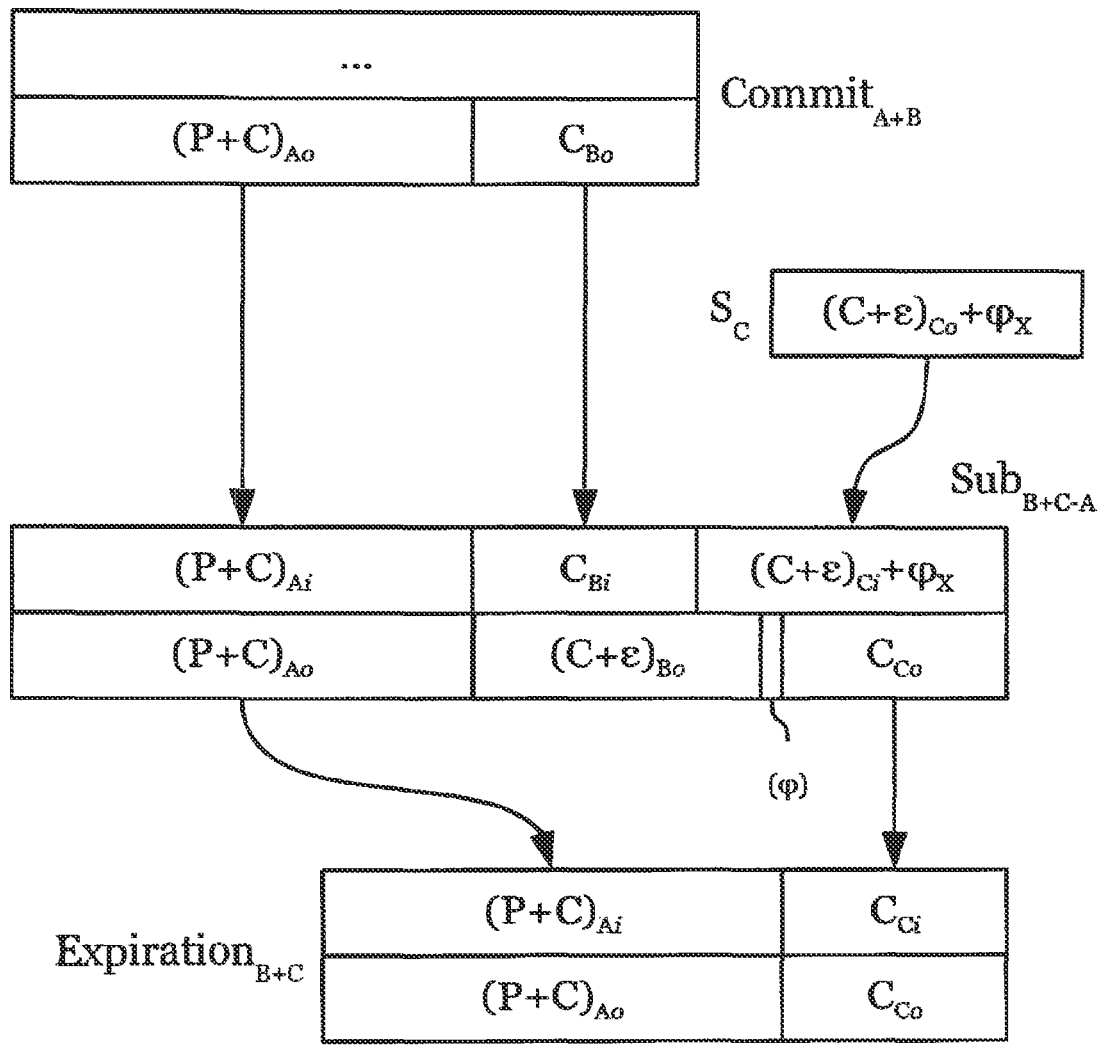
Figure 14:
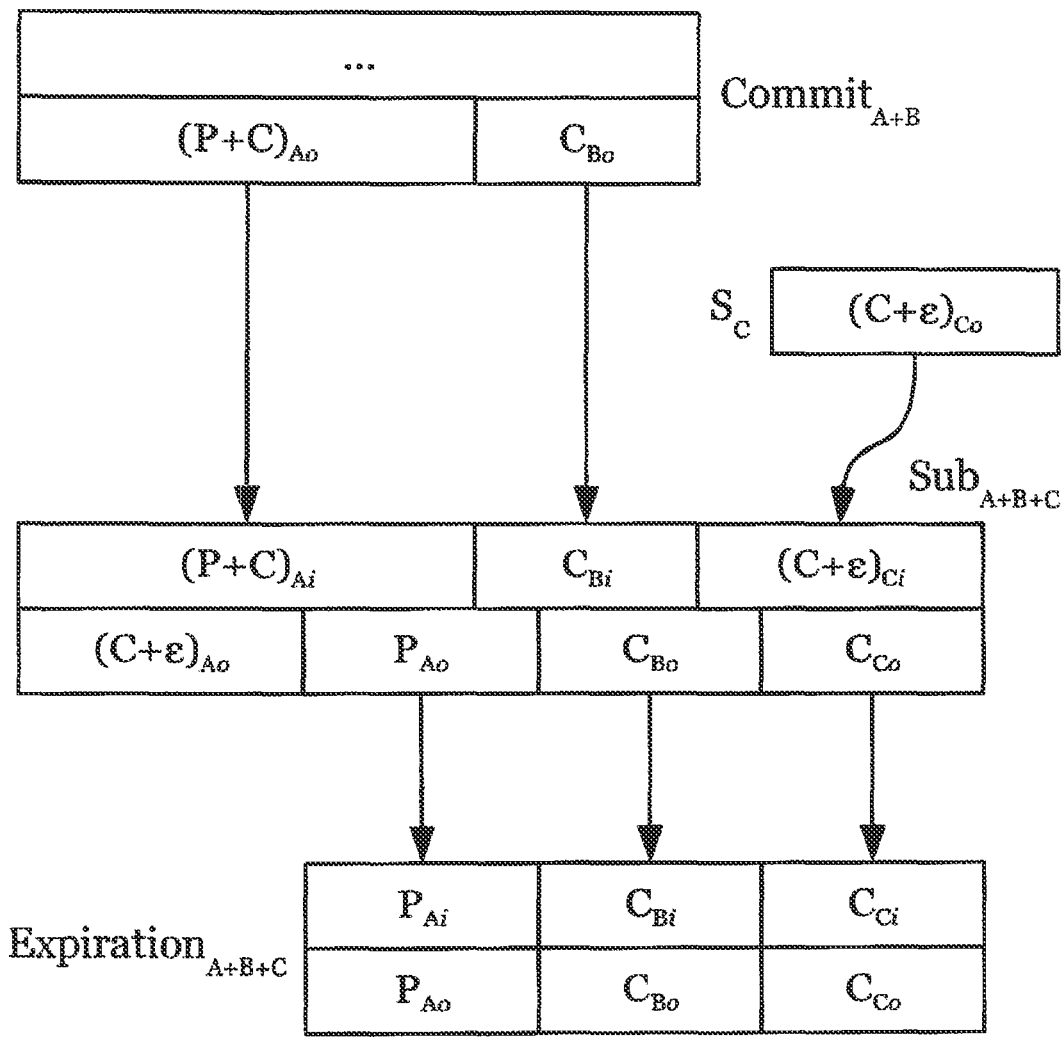

FIGS. 12-14 depict transaction chains from various example L/C embodiments comprising substitutions of parties. FIG. 12 depicts aspects of an embodiment where a payer party (A) has convinced a substituting party (C) to substitute into a transaction with a payee party (B). In addition, the payer party transfers a negotiated amount (c) to the substituting party. For example, the payer party could have committed to purchasing goods from the payee party, but due to unanticipated market conditions, decided to sell the right to take delivery of the goods to the substituting party at a loss. This is facilitated in the depicted embodiment by a substitution transaction and a second expiration transaction. In a related embodiment where the payer party sold the right to take delivery for a profit, the negotiated amount might flow from the substituting party to the payer party. In the embodiment depicted in FIG. 12, an optional fee ((p) is paid to a third party, and is born by the payee party.

FIG. 13 depicts aspects of an embodiment where a payee party (B) has convinced a substituting party (C) to substitute into a transaction with a payer party (A). In addition, the substituting party transfers a negotiated amount (0 to the payer party. For example, the third party, may be interested in having the right to receive payment under a future disbursement transaction, perhaps due to the decreasing relative value of the substituting party's other assets. This is facilitated in the depicted embodiment by a substitution transaction, and a second expiration transaction. In a related embodiment where the payee party sold the right to receive payment at a loss, the negotiated amount might flow from the payee party to the substituting party. Similar to FIG. 12, in the embodiment depicted in FIG. 13, an optional fee ((p) is paid to a third party, and is born by the substituting party.

FIG. 14 depicts aspects of an embodiment where a payer party (A) has convinced a substituting party (C) to substitute in part (as depicted to cover the collateral originally paid by the payer party) into a transaction with a payee party (B). In addition, the substituting party transfers a negotiated amount ($\epsilon$) to the payer party. This is facilitated in the depicted embodiment by a substitution transaction and a second expiration transaction. In some embodiments, the substitution output of the substitute transaction comprises a condition requiring approval of three of three parties, three of four parties, or two of four parties (e.g., where the substituting party has been delegated authority to approve or sign on behalf of itself and for the payer party). Many possible configurations are contemplated by the invention. In such embodiments, the facilitator can act as a referee in creating the substitution transaction to the satisfaction of all parties, for example, maintaining the ability to dispute the transaction with a chosen mediator as described below.

For clarity of illustration in FIGS. 12-14, the outputs of the commit transaction and the corresponding inputs of the substitution transaction are depicted as separate for each of the first joined principal and collateral (($P+C)_A$), and the second collateral ($C_B$). This is not a limitation of the invention. The outputs of the commit transaction, and corresponding inputs of the substitution transaction could be any configuration considered valid by the transfer mechanism. The outputs of the substitution transaction and inputs to the second commit transaction are similarly depicted for clarity of illustration. Again, all valid configurations of inputs and outputs between transactions are contemplated by the invention. Also, in other embodiments, any fee could be paid, in part or in whole, by any party, even a fourth party.

Where a decentralized digital currency (e.g., the Bitcoin protocol, the Ethereum protocol, or similar) is used as the transfer mechanism, another embodiment of the invention enables arbitrary offers—such as offers for arbitrary swaps, L/Cs, and any other offer where terms describing that may be expressed and interpreted by the facilitator—to be made by submitting a specialized transaction record in which the terms, a reference to the terms (e.g., a URI for the terms, a hash of the terms, etc.), or some combination thereof is encoded into the transaction record itself, rather than associated via an extra-transfer mechanism means (i.e., "off block chain" in decentralized digital currency terms), such as a centralized authority, or shared decentralized data store (e.g., a torrent, an "altcoin", etc.).

In one embodiment, this could be encoded as transaction record metadata, or unused data in an input or output (e.g., <data>OP_DROP <script>, via the OP_RETURN <data> technique in a single output, etc.). For illustration, the following steps describe but a few of many such embodiments: [0294] 1. In one embodiment, a first client (offeror) creates an offer transaction record comprising associated data and an offer output comprising an offer amount and a condition requiring approval of one of a first party and, optionally, a facilitator. The associated data comprise one or both of terms and a reference to the terms. Optionally, the associated data comprise a reference to the facilitator (e.g., a domain name, a payment address, D&B number, URI, etc.). Also optionally, the first client transmits the terms, the associated data, or offer transaction record to the facilitator for validation before submitting it to the transfer mechanism (e.g., to ensure the facilitator can interpret the terms, that the facilitator is appropriately identified, etc.). In another embodiment, at the first client's request, the facilitator creates an inchoate offer transaction record (e.g., not including a signed input) for creating a complete offer transaction record, and the first client optionally verifies whether the facilitator created the inchoate offer transaction record correctly, whether it's available via the facilitator-provided reference (if applicable), etc.

Example Inchoate Offer Transaction Record:

```
% #Post the terms to the facilitator
% curl -X POST -d
s{"base":"USD","quote":"AUD","denom":"BTC","pcpl":0.5,"cltl":1.0,
"res": "symunbound","offerexp":"2014-06-
01T00:00:00Z","swapexp":"2014-07-
01T00:00:00Z","facuri":"https://facilitator.dom/api/v1"} ...
https://facilitator.dom/api/v1/swap
{"ok":true,"offersha256":"3a72...f9a4","offerref":"facswap:3a72...
f9a4","offeruri":https://facilitator.dom/api/v1/swap/3a72...f9a4]
    ID: 9fcd...429c
    ...
    Output:
        Value: 150000000
        scriptPubKey: 666163737761703a3a72...f9a4 OP_DROP 1
        67c1...4a70 cffd...1373 2 OP_CHECKMULTISIG
    ...
```

In this example embodiment, the facilitator prefixes a hash of the terms with "666163737761703a", which is hexadecimal for the eight byte ascii string "facswap:". This is not necessary, but might be a convenient means by which transactions could be recognized as being of a certain "type", which is useful for monitoring by network participants.

Alternate Embodiment Example Offer Transaction Record:

```
% #Post the terms to the facilitator
% curl -X POST -d s{"pubkey":"67c1...4a70","terms":
{"base":"USD",...,"facuri":"https://facilitator.dom/api/v1 "}y ...
https://facilitator.dom/api/v1/swap
{"ok":true,"offersha256":"3a72...f9a4","offerref":"facswap:3a72...f9a4",
"offeruri":"https://facilitator.domlapi/v1/swap/3a72...f9a4","offerbm":
"04000000...0280d1f008000000008901014b67c1...4a704bcffd...13730102ae...
00000000000000002a6a28666163737761703a3a72...f9a400000000"}
% #Validate "offerbm", add change outputs, etc.
"offerbm" is annotated as follows:
04000000 [version: 4]... 02 [output count: 1]80d1f00800000000
[amount: 1.5 BTC]89 [script len: 137]01
[push next 1 byte]01 [1]4b [push next 75 bytes]67c1...4a70 [pub. key] 4b [push next 75 bytes]
cffd...1373 [fac. pub. key]01 [push next 1 byte] 02 [2]ae
[OP_CHECKMULTISIG]... 0000000000000000 [amount: 0.0 BTC] 2a
[script len: 42] 6a [OP_RETURN] 28 [push next 40 bytes]
666163737761703a3a72...f9a4 [offerref: "facswap:3a72...f9a4"]00000000
[lock time: none]
```

Note that some parts (such as any inputs or input placeholders) have been skipped with ellipses to assist with readability. In an alternate embodiment, Pay-to-Script Hash (P2SH) is used to obscure the output script that would normally be present in a parent transaction. In such an embodiment the actual output script would be transmitted to the necessary participants via some other means.

2. In one embodiment, the first client creates, or, in another embodiment, the facilitator creates an inchoate commit transaction record for creating a complete commit transaction record much like those described in previous embodiments, except whose first commit input is for accepting the offer amount from the offer transaction, and whose second input is for accepting an amount from a source transaction yet to be identified.

3. The first client creates a complete offer transaction record by signing and the inchoate offer transaction record and submits it to the transfer mechanism to effect the offer transaction.

4. The facilitator receives the offer transaction from the transfer mechanism.

5. A second client transmits a public key to the facilitator.

6. The facilitator adds the public key to the inchoate commit transaction record and transmits the inchoate commit transaction record to the second client.

7. The second client signs a source transaction record having a transaction ID.

8. The second client adds the transaction ID to the inchoate commit transaction record and signs it.

Example Inchoate Commit Transaction Record:

```
Input:
    Previous tx: 9fcd...429c
    Index: 0
    scriptSig: [sig. placeholder]
Input:
    Previous tx: b5e8...6f57
    Index: 6
    scriptSig: 9b6b...8f3701 ac2f...b01b
Output:
    Value: 149990000
    scriptPubKey: 2 67c1...4a70 dbe4...4cbe cffd...1373 3
    OP_CHECKMULTISIG
...
```

9. The second client transmits the signed inchoate commit transaction record to the facilitator. [0309] 10. Either the first client or, optionally (where allowed), the facilitator creates the complete commit transaction record (e.g., ID: 6996 . . . ec3d) by signing the signed inchoate commit transaction record, optionally storing the complete commit transaction record in non-transitory memory.

Embodiments where one of the first party and the facilitator can approve spending the offer output require the first party to trust the facilitator to perform some verification (e.g., that the source transaction record has sufficient assets, that a nefarious party is not attempting to commit a huge number of very tiny inputs such that the mining fee will be large, or difficult to meet, etc.) and to craft the complete commit transaction record correctly and consistently with the terms.

11. The facilitator creates an inchoate refund or expiration transaction record and transmits the inchoate refund or expiration transaction record to the second client.

12. The second client signs the inchoate refund or expiration transaction record and transmits the signed inchoate refund or expiration transaction record to the facilitator.

13. Either the first client or, optionally (where allowed), the facilitator creates a complete refund or expiration transaction record by signing the inchoate refund transaction record, and stores the complete refund or expiration transaction record in non-transitory memory.

14. The facilitator transmits the complete commit transaction record and the complete refund or expiration transaction record to the second client.

15. The second client submits the source transaction record to the transfer mechanism to effect the source transaction.

16. After seeing that the source transaction has been submitted, one, several, or all of the first client, the second client, and the facilitator submit the complete commit transaction record to the transfer mechanism, after which the process is analogous to previously described embodiments.

In an alternate embodiment, the offer comprises a "hard offer", the condition of the offer output requires approval of both the first party and the facilitator, and the facilitator signs and transmits to the first party an offer expiration transaction record comprising a lock time set to the time the hard offer expires, an input for receiving the offer amount, and an expiration output comprising an expiration amount and a condition requiring approval of the first party.

In other embodiments of the invention, the transacting parties agree on a third party to act as a mediator in a dispute. For example, if the facilitator becomes unavailable, rather than electing to invoke a refund, one party triggers a dispute whereby a mediator stands in place of the unavailable facilitator. The condition of the commit output of the commit transaction requires approval of two of the first party, the second party, the facilitator, and the mediator. On or after the expiration timestamp, or at a time or upon an event as defined by the terms, and before the lock time of the complete refund transaction record, each of the disputing party and the mediator signs and one party submits a dispute transaction record comprising an input for receiving the commit amount from the commit transaction, and a dispute output comprising a dispute amount and a condition requiring approval of two of the first party, the second party, and the mediator. Once the dispute as been resolved, either the parties sign, or the mediator and one of the parties sign a settlement transaction record similar to the disbursement transaction record above, but reflecting the mediated settlement.

Figure 15:
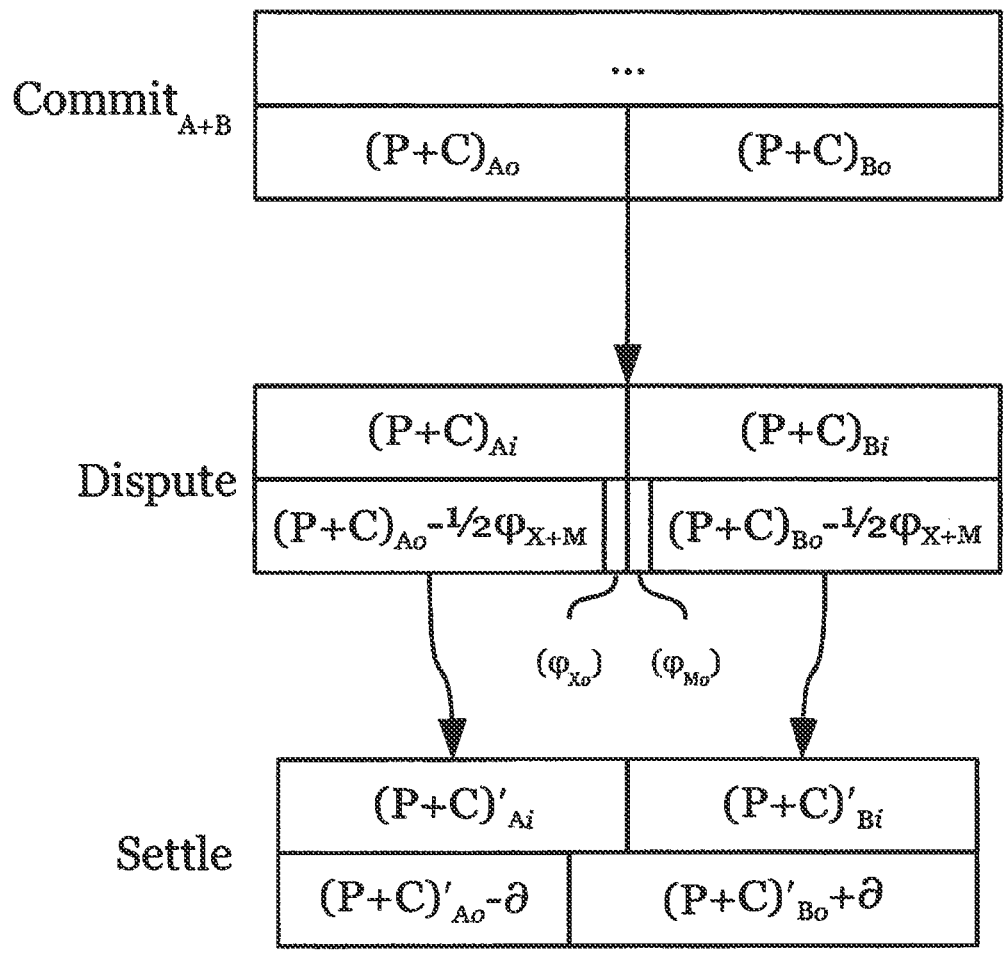
FIGS. 15-16 depict aspects of embodiments where the parties engaged in a value transfer have designated a mediator to resolve any dispute that may arise.
Figure 16:
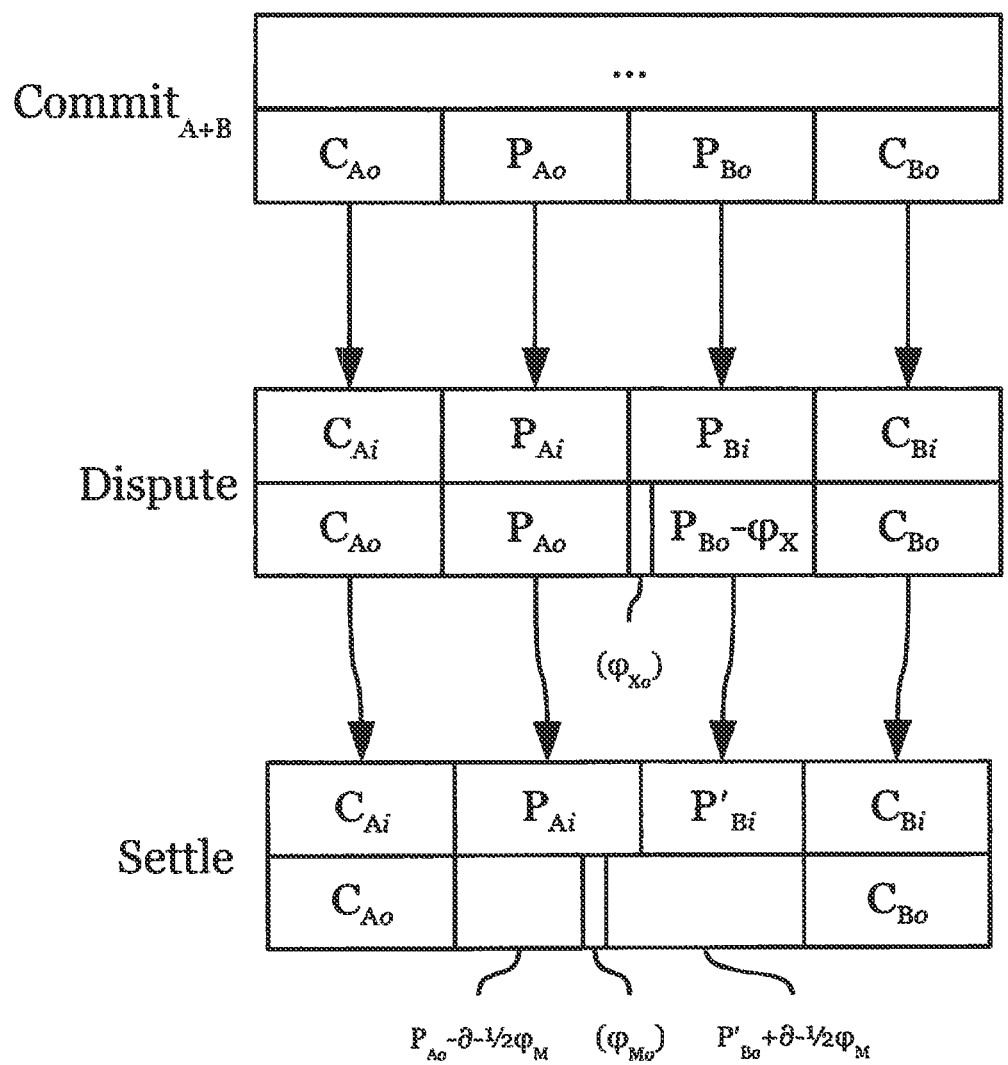

FIGS. 15-16 depict aspects of two such embodiments. In FIG. 15, the dispute transaction further comprises a first fee output comprising a facilitator fee amount (q) and second fee output comprising a mediator fee amount ($\varphi_M$), the fees being shared by the parties. In FIG. 16, the dispute transaction comprises the facilitator fee amount shared by the parties, and the settlement transaction comprises the mediator fee amount paid by the party that initiated the dispute (B). In another embodiment, any mediator fee is determined as a term of the settlement, and included with the settlement transaction.

Optionally (and preferably), the parties also sign and transmit to each other a dispute refund transaction record similar to that above, but instead taking its input from the dispute transaction, and with a lock time set in the future with enough time to reach a settlement. This way if the mediator becomes unavailable, the parties can again revert to submitting the dispute refund transaction record. In another embodiment, the dispute transaction could also be "mediatable", allowing for a chain of such disputes, for example naming a second mediator in the event that the mediator becomes unavailable, or the same mediator to allow more time to reach a settlement if the lock time of the dispute refund transaction record is approaching.

In other embodiments, mediation can be automated. For example, in embodiments pertaining to swaps or similar transactions, the facilitator periodically transmits an unsigned disbursement transaction record to the parties as if the trade were halted at the time the unsigned disbursement transaction record is created. The unsigned disbursement transaction comprises a verifiable time at which it was created, or a reference to such a time (e.g., where the transfer mechanism is the Bitcoin or similar protocol, as unused but signed data embedded in one of the scripts, signature by a separate key owned by the facilitator, but not used for signing any inputs, etc.). If the facilitator becomes unavailable before it can transmit to the parties or submit the signed disbursement transaction record, and remains unavailable past the expiration time, a dispute could be initiated, and the parties would have a window during which they have an opportunity to transmit the terms (preferably signed by each party, but this is not necessary if the parties agree on the terms, i.e., both transmit the same terms to the mediator) and some or all of the unsigned disbursement transaction records they received from the facilitator to the mediator. The mediator examines the undisputed or signed terms, and all verifiable unsigned disbursement transaction records received from both parties. In one embodiment, the mediator merely selects the most recent verifiable unsigned disbursement transaction record. In another embodiment, the mediator "plays back" the unsigned disbursement transaction records in order, verifying whether any unsigned disbursement transaction record should have triggered an early exit to the trade (e.g., if principal and any collateral of one party was exhausted). In yet another embodiment, the mediator performs its own independent evaluation of the terms, possibly requesting information from one or more data sources, to stand in place of the facilitator by creating a new settlement transaction record as close to the disbursement transaction record that would have been created by the facilitator if it was available as the mediator is able to determine.

Note that the depicted embodiments are among the more basic of the invention. The various combinations of source transactions, commit transactions, disbursement transactions, refund transactions, expiration transactions, inputs, outputs, and parties, as well as any principal, collateral, or fees, are limited only by the agreements among the participating parties and are enabled by the invention. Additionally, certain steps of the embodiments disclosed throughout this application are described as being performed by certain entities. In other embodiments, similar or equivalent steps could be performed—wholly or partly—by different parties in lieu of or in addition to those described herein. All such embodiments are considered within the scope of the invention.

As a very simple example, in an embodiment using a decentralized digital currency, transactions use P2SH in place of multi-sig transactions. Other steps may be omitted in certain embodiments. For example, in an embodiment using a decentralized digital currency, the creation of the signed complete refund or expiration transaction record—while highly recommended as a contingency to avoid loss in case the facilitator or counterparty disappears or becomes uncooperative—is not strictly necessary to practice the invention. In embodiments involving a mediator, an unsigned dispute transaction record could be created by the facilitator and transmitted to the parties for use with the mediator, for example, at the time the refund or expiration transaction record is created and transmitted.

Figure 17:
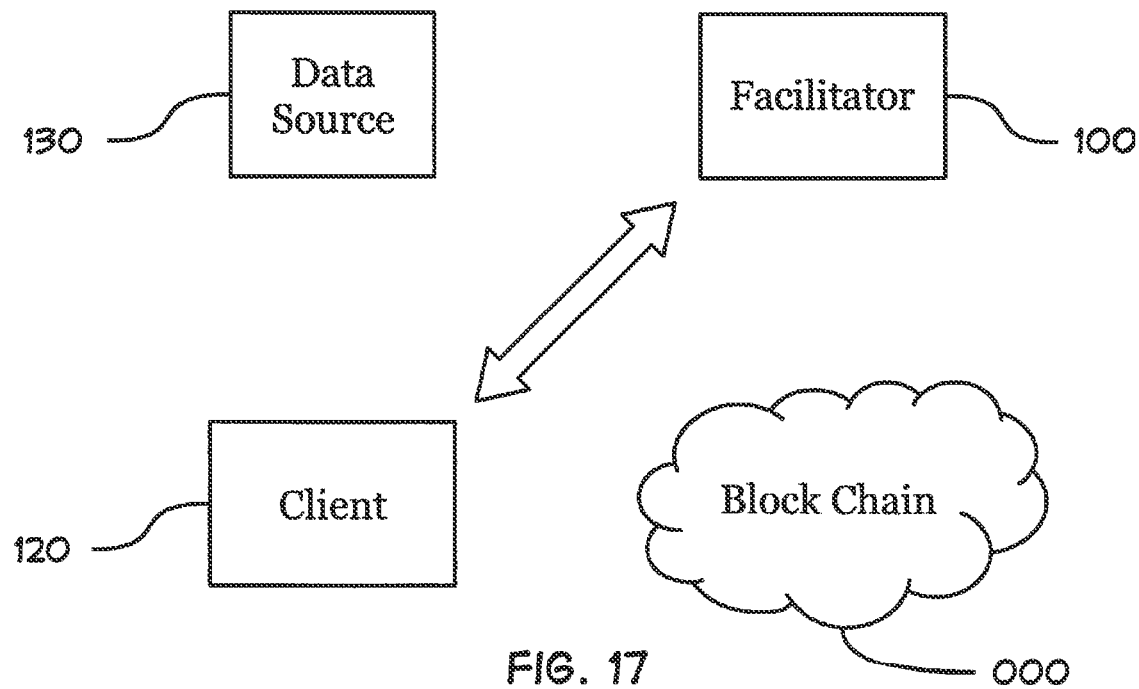
FIGS. 17-22 depict major phases of effecting a value transfer within one embodiment.
Figure 18:
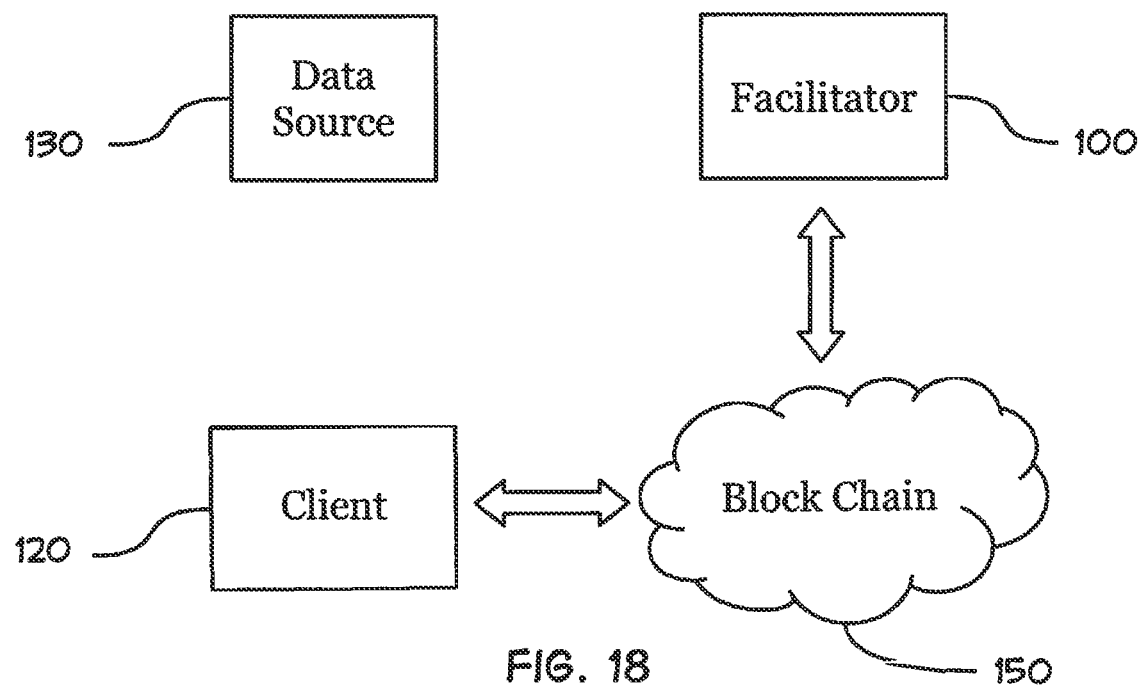
Figure 19:
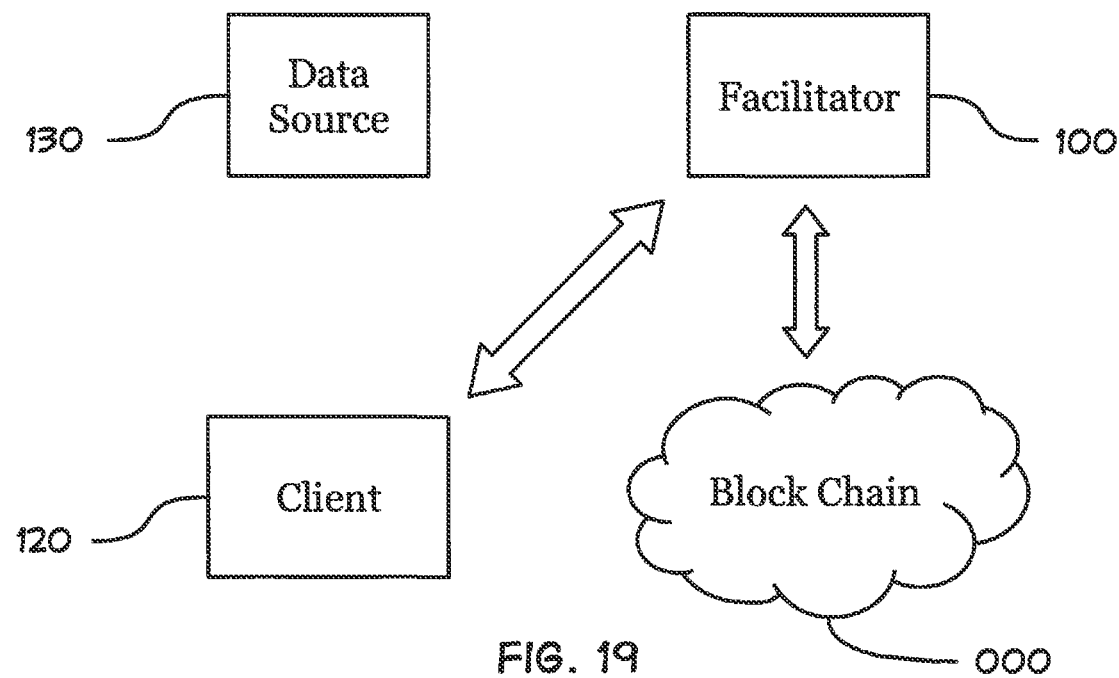
Figure 20:
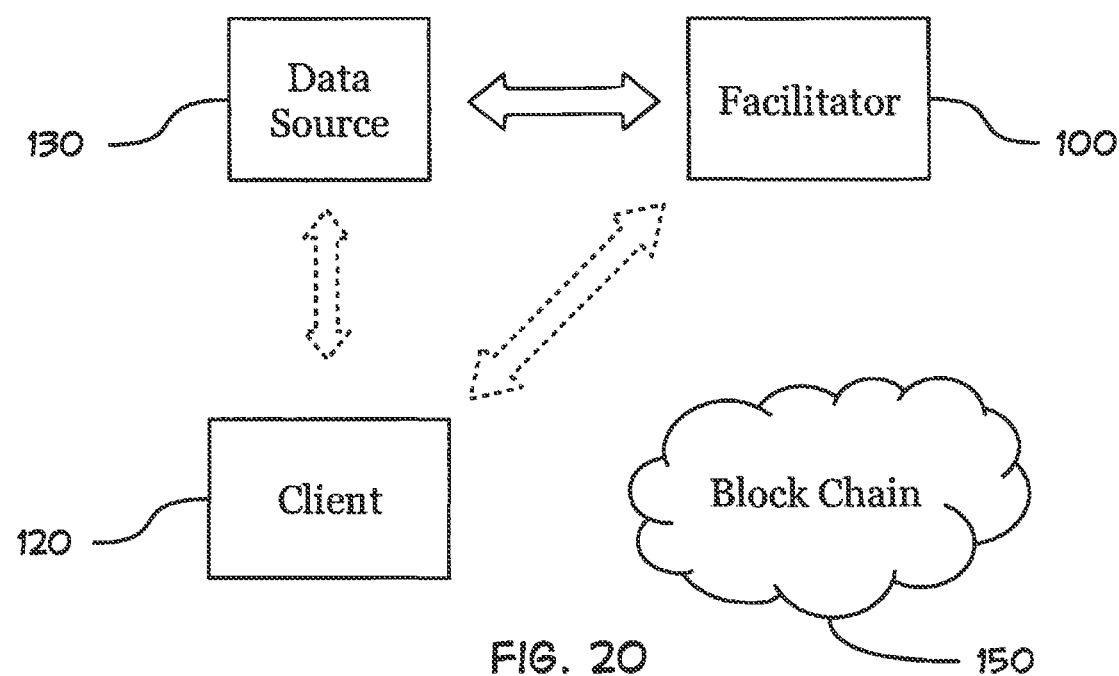
Figure 21:
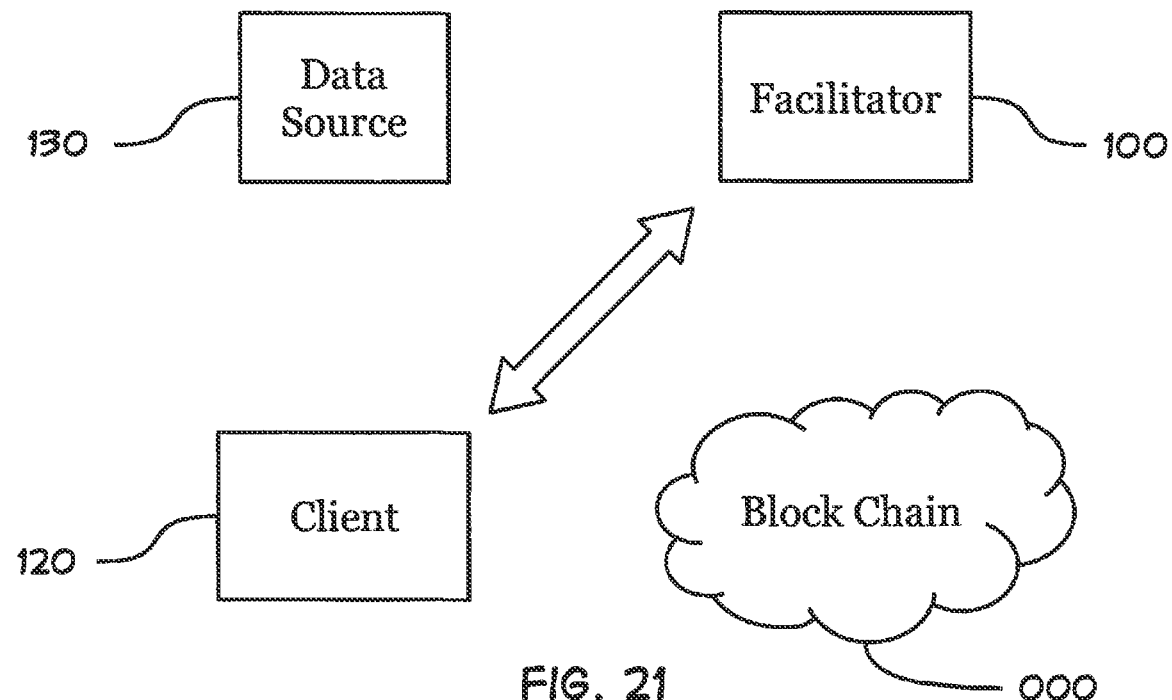
Figure 22:
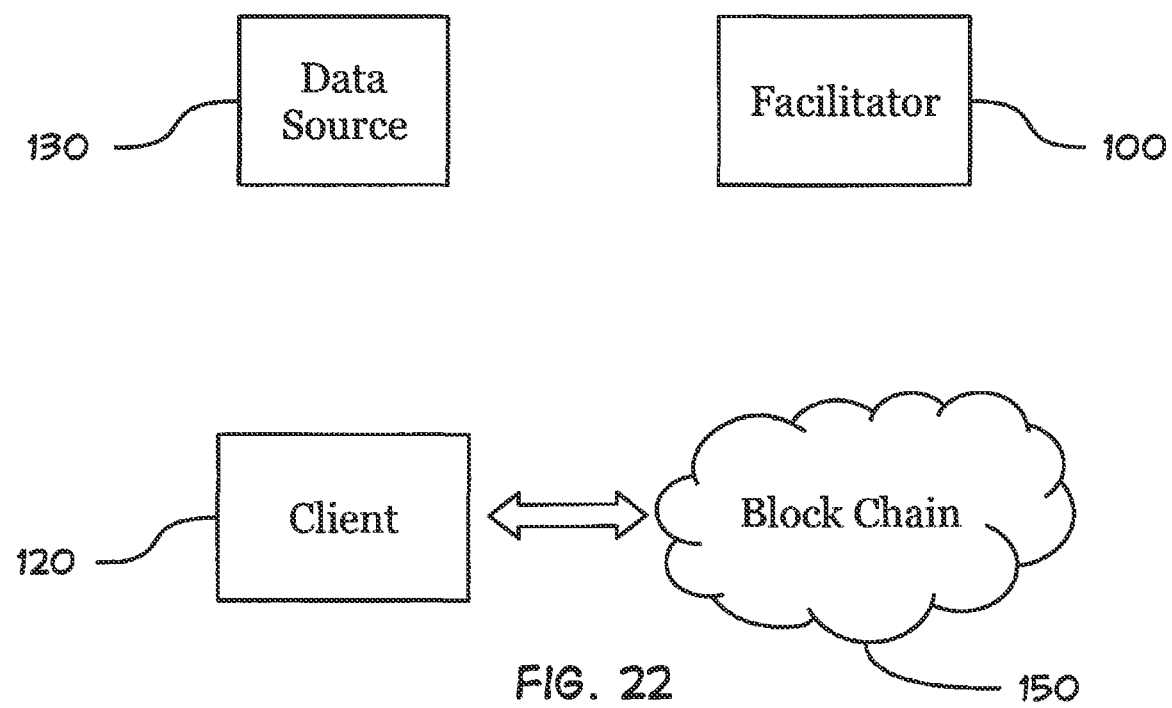

FIGS. 17-22 depict major phases of effecting a value transfer in the form of a swap within one embodiment using a transfer mechanism comprising a decentralized digital currency comprising a block chain. FIGS. 17-18 depict a first phase, wherein the client validates a first order comprising terms (e.g., base instrument, quote instrument, principal, collateral, disbursement function, expiration timestamp, etc.) with the facilitator. The client submits (broadcasts) a first principal transaction record conforming to the terms to the transfer mechanism to create a first principal transaction. The facilitator monitors the block chain for updates and activates the first order when the first principal transaction has been confirmed. FIG. 19 depicts a second phase, wherein the facilitator matches the first order with a second order, and commits the outputs from the first principal transaction and second principal transaction by creating and submitting (broadcasting) a commit transaction record to the transfer mechanism to create a commit transaction. Optionally, the facilitator also creates and makes available to each client a refund or "rollback" transaction record that spends the outputs from the commit transaction, but cannot be used until well after the expiration timestamp. If the facilitator fails catastrophically, either client can sign and submit the refund transaction record to place both clients back in their original respective positions. FIG. 20 depicts a third phase, where the facilitator receives one or more values from the data source and monitors the valuation by applying the disbursement function to the value(s), the principal, and any collateral to check whether the principal and any collateral of any one party is exhausted. Optionally, each client receives status updates from the facilitator and audits the facilitator's status by independently receiving one or more values from the data source. FIGS. 21-22 depict a final phase, where, after the expiration timestamp (or if the principal and any collateral of any party is exhausted, whichever is sooner), the facilitator creates and signs an inchoate disbursement transaction record that spends the commit transaction's output(s) and comprises one or more disbursement outputs comprising one or more disbursement amounts. Either client receives the inchoate disbursement transaction record and completes (signs) it to create a completed disbursement transaction record. The client submits (broadcasts) the complete disbursement transaction record to the transfer mechanism to create the disbursement transaction, simultaneously releasing both client's funds.

Figure 23:
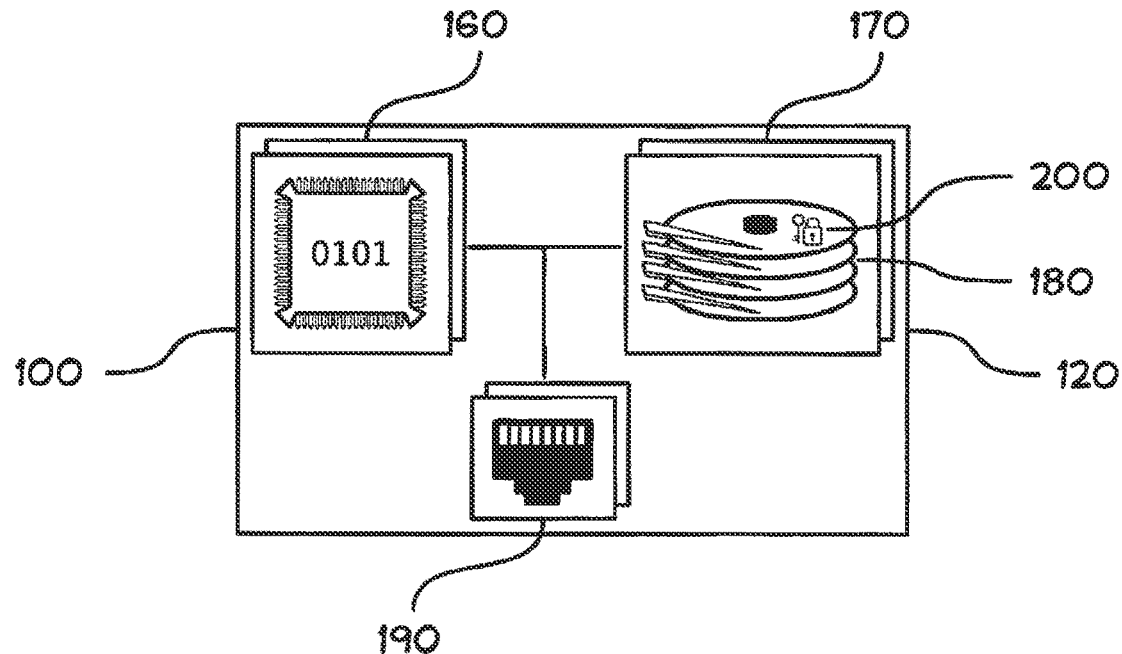
FIG. 23 depicts components comprising a typical embodiment of a client or facilitator.

FIG. 23 depicts the components comprising a typical embodiment of a client (120) or facilitator (100). This comprises a computer processor (160) coupled to a memory (170) and a network interface (190). The computer processor (160) is not limited to a single processing unit as depicted, but could comprise multiple cores, multiple computer processors, a cluster of networked computing devices, or combinations thereof as known in the art. The memory (170) is not limited to a hard disk as depicted, but could comprise any non-transitory memory technology that allows data to be stored in distinct logical sectors (180) (e.g., one or more logical files in a file system, one or more logical records in a file or database, etc.), and that the data persists in the event that the power supply to the computer processor is interrupted. Non-limiting examples include solid state storage, flash drives, RAID, JBOD, NAS, remote storage services such as Amazon's S3 or Google's Cloud Storage, a cluster of memory devices, etc., or combinations as known in the art. In the case of the client (120), the memory (170) comprises one or more logical sectors which comprise one or more key pair sectors for storing an asymmetric key pair (200). In the case of the facilitator (100), the memory (170) comprises one or more logical sectors which comprise one or more key pair sectors (200) as well as one or more transaction record sectors for storing one or more transaction records. The network interface (190) is not limited to a single network interface as depicted. As non-limiting examples, the network interface could comprise multiple network interfaces optionally comprising a load balancer, two or more multiplexed network interfaces, etc., or combinations thereof as known in the art.

Figure 24:
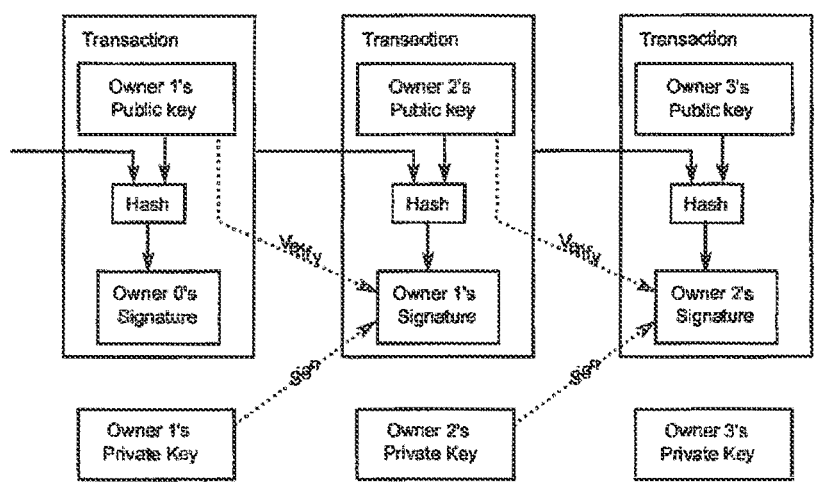
FIG. 24 (prior art) depicts a simplified chain of ownership in a decentralized digital currency.

FIG. 24 (prior art) depicts a simplified chain of ownership in a decentralized digital currency. In reality, a transaction can have more than one input and more than one output.

INDUSTRIAL APPLICABILITY

The invention pertains to agreements among distinct parties that contemplate transfer of title to property, as well as any industry where that may be of value or importance.

Glossary

These are brief descriptions of terms provided for convenience. They are not intended to be limiting definitions, but rather to augment any features, characteristics, behaviors, or embodiments that are understood in the art or described elsewhere in the specification.

"client" (120)—A device comprising a computer processor (160), a memory (170) comprising a key pair sector (200) for storing an asymmetric key pair, and a network interface (190), and that is configured to interact with at least one of a facilitator (100) or another client (120, 170) for facilitating value transfers via a transfer mechanism (110) according to the invention.

"cryptocurrency"—See "decentralized digital currency".

"decentralized digital currency" (150)—A transfer mechanism (110) comprising a distributed ledger of transactions (often referred to as a "block chain", e.g., with the Bitcoin protocol and progeny) and typically one or more network participants, the network participants comprising one or more miners. Also referred to as a "cryptocurrency".

"facilitator" (100)—A device for facilitating a value transfer between a first party utilizing a first client (120, 160) and a second party utilizing a second client (120, 170) via a transfer mechanism (110) according to the invention, the device comprising a computer processor (160), a memory (170) comprising a transaction record sector and a key pair sector (200) for storing an asymmetric key pair, and a network interface (190).

"instrument"—A tradable thing of value of any kind; either cash, evidence of an ownership interest in an entity, or a contractual right to receive or deliver cash or another financial instrument. Also referred to as a "financial instrument". According to International Financial Reporting Standards, "any contract that gives rise to a financial asset of one entity and a financial liability or equity instrument of another entity".

"lock time"—A timestamp comprising a date and a time and optionally a time zone that prevents the transaction from being accepted as valid by the transfer mechanism until the timestamp has passed.

"party"—A legal entity capable of exercising property rights, e.g., a person or corporate entity.

"publish[ing] [a] transaction record to [a device]"—Making the transaction record available for reading or copying by the device, for example, by sending the transaction record to the device via a network interface (190), or writing the transaction record to a transaction sector in a memory in such a way that the transaction record can be read or copied by the device, optionally implementing a permissions scheme allowing the device to read or copy, but not create, update, or destroy the transaction record. Non-limiting examples include a shared file system (e.g., NFS, SSHFS, etc.), a database API (e.g., SQL, REST, etc.), a proprietary API, third party shared storage (e.g., Google Does, Dropbox, etc.), etc.

"submit[ting] [a] transaction record to [a transfer mechanism (110)]"—The process by which a valid transaction record is accepted by a transfer mechanism (110) to effect a transaction. In the context of a decentralized digital currency (150), this typically comprises broadcasting the transaction record to one or more network participants, having the transaction record accepted by one or more miners who include the transaction record in a valid block that is transmitted to and accepted as valid by a majority of network participants. In the context of decentralized digital currencies (150), acceptance of a transaction as valid by a majority of network participants is permanent and irreversible (except under very limited circumstances, e.g., if the transaction record is later discovered by a majority of network participants to be invalid because it attempted to spend already-spent outputs).

"transaction"—A unit of value transfer in a transfer mechanism (110) that recharacterizes ownership or control of assets (sometimes based on certain conditions). In the context of decentralized digital currencies (150), this is sometimes referred to as a "confirmed transaction", meaning a transaction record that has been accepted into the ledger or block chain by a majority of network participants.

"transaction record"—A data structure describing a transaction and submitted to a transfer mechanism to effect a transaction. As a non-limiting example, in the context of a decentralized digital currency, the transaction record typically comprises one or more inputs (although zero inputs is possible in special cases), one or more outputs, and optionally a cryptographic signature. In the context of decentralized digital currencies (150), this is also (sometimes confusingly) referred to as a "transaction". To avoid ambiguity, this specification uses "transaction record" to refer to the data structure that may be transmitted or received among network participants, and "transaction" to refer to the part of a ledger or block within a block chain comprising the transaction record, the ledger or block being accepted as valid by a majority of network participants (i.e., a "confirmed transaction").

"transfer mechanism" (110)—A means (e.g., a decentralized digital currency) by which a transaction is created (e.g., by successful submission of a transaction record) and enforced.

"value transfer"—The process of transferring a right (e.g., ownership, control, etc.) to one or more items having economic value (e.g., money, goods, services, obligations to perform, etc.) from one party to another.

What is claimed is:

1. A system for processing a transaction between a first client device and a second client device via a transfer mechanism, the system comprising:
a computing device, and
the first client device,
the system configured to communicate with a second client device and the transfer mechanism;
the computing device comprising:
a first memory for storing a first asymmetric key pair, the first asymmetric key pair comprising a first private key and a first public key;
a first network interface for receiving terms, the terms comprising:
at least one of a first principal data or a second principal data; and
a reference to at least one of a first data source or a second data source; and
a first computer processor coupled to the first memory and the first network interface, the first computer processor configured to:
read the first private key from the first memory;
compute a first cryptographic signature from the first private key;
retrieve a value from at least one of the first data source or the second data source;
create an inchoate data record comprising:
a commit input for receiving a commit data from a commit transaction;
one or more outputs obtained from at least one of the first principal data or the second principal data;
information from at least one of the first data source or the second data source; and
the first cryptographic signature; and
publish the inchoate data record to at least one of the first client device or the second client device;
wherein the inchoate data record is configured to be signed by at least one of the first client device and second client device after verifying the information to obtain a complete data record for publishing to the transfer mechanism;
the first client device comprising:
a second memory for storing a second asymmetric key pair, the second asymmetric key pair comprising a second private key and a second public key;
a second network interface; and
a second computer processor coupled to the second memory and the second network interface, the second computer processor configured to:
read the second private key from the second memory;
read the inchoate data record;
compute a second cryptographic signature from the second private key;
in response to verifying the information, creating a complete data record comprising:
the commit input;
the output data;
the first cryptographic signature; and
the second cryptographic signature; and
create a transaction by submitting the complete data record to the transfer mechanism; wherein:
the transfer mechanism implements a digital currency or a unit of account that is accessible via a computer network by the computing device, the first client device, and the second client device, respectively, and that enables processing the transaction between the first client device and the second client device, and the transaction is created by broadcasting the complete data record for transmitting and receiving among network participants in the computer network for recording in a distributed ledger.

2. The system of claim 1, wherein the terms further comprise an expiration timestamp that is explicitly or implicitly set from zero to infinity time units.

3. The system of claim 1, wherein:
the computing device and the first client are the same device;
the first computer processor and the second computer processor are the same processor;
the first memory and the second memory are the same memory;
the first network interface and the second network interface are the same network interface; and
the first asymmetric key pair and the second asymmetric key pair are the same asymmetric key pair.

4. The system of claim 1, wherein:
the computing device and the first client are the same device;
the first computer processor and the second computer processor are the same processor;
the first memory and the second memory are the same memory; and
the first network interface and the second network interface are the same network interface.

5. The system of claim 1, wherein the first computer processor is further configured to:
compute a third cryptographic signature from the first private key;
create another inchoate data record comprising:
a commit input for receiving the commit data from the commit transaction;
a refund output comprising a refund data; and
the third cryptographic signature; and
publish the another inchoate data record to at least one of the first client and the second client.

6. The system of claim 3, wherein the first computer processor is further configured to:
compute a third cryptographic signature from the first private key;
create another inchoate data record comprising:
a commit input for receiving the commit data from the commit transaction;
a refund output comprising a refund data; and
the third cryptographic signature; and
publish the another inchoate data record to at least one of the first client and the second client.

7. The system of claim 4, wherein the first computer processor is further configured to:
compute a third cryptographic signature from the first private key;
create another inchoate data record comprising:
a commit input for receiving the commit data from the commit transaction;
a refund output comprising a refund data; and
the third cryptographic signature; and
publish the another inchoate data record to at least one of the first client and the second client.

8. A method to process a transaction between a first client device and a second client device via a transfer mechanism that is accessible via a computer network by a computing device, the first client device, and the second client device, the computing device comprising a first memory, a first network interface, and a first computer processor coupled to the first memory and the first network interface, the first client comprising a second memory, a second network interface, and a second computer processor coupled to the second memory and the second network interface, and the second client device comprising a third memory, a third network interface, and a third computer processor coupled to the third memory and the third network interface, the method comprising:
storing a first asymmetric key pair in the first memory, the first asymmetric key pair comprising a first private key and a first public key;
receiving terms by the first network interface, the terms comprising:
at least one of a first principal data or a second principal data; and
a reference to at least one of a first data source or a second data source; and
reading by the first computer processor the first private key from the first memory;
computing by the first computer processor a first cryptographic signature from the first private key;
retrieving by the first computer processor information from at least one of the first data source or the second data source;
creating by the first computer processor an inchoate data record comprising:
a commit input for receiving a commit data from a commit transaction;
one or more outputs obtained from at least one of the first principal data or the second principal data;
datum from the information; and
the first cryptographic signature;
publishing by the first computing processor the inchoate data record to at least one of the first client device or the second client device;
wherein:
the inchoate data record is configured to be signed by at least one of the first client device and second client device after verifying the datum to obtain a complete data record for publishing to the transfer mechanism;
the transfer mechanism implements a digital currency or a unit of account that enables processing the transaction between the first client device and the second client device without the need for a trusted central authority, and
the transaction is created by broadcasting the complete data record for transmitting and receiving among network participants in the computer network for recording in a distributed ledger.

9. The method of claim 8, wherein the terms further comprise an expiration timestamp that is explicitly or implicitly set from zero to infinity time units.

10. The method of claim 8, wherein:
the computing device and the first client are the same device;
the first computer processor and the second computer processor are the same processor;
the first memory and the second memory are the same memory;
the first network interface and the second network interface are the same network interface; and
the first asymmetric key pair and the second asymmetric key pair are the same asymmetric key pair.

11. The method of claim 8, wherein:
the computing device and the first client are the same device;
the first computer processor and the second computer processor are the same processor;

the first memory and the second memory are the same memory; and the first network interface and the second network interface are the same network interface.

12. The method of claim 8, further comprising:

computing by the first computer processor a third cryptographic signature from the first private key;

creating by the first computer processor another inchoate data record comprising:
 a commit input for receiving the commit data from the commit transaction;
 a refund output comprising a refund data; and
 the third cryptographic signature; and publishing by the first computer processor the another inchoate data record to at least one of the first client and the second client.

13. The method of claim 10, further comprising:

computing by the first computer processor a third cryptographic signature from the first private key;

creating by the first computer processor another inchoate data record comprising:
 a commit input for receiving the commit data from the commit transaction;
 a refund output comprising a refund data; and the third cryptographic signature; and publishing by the first computer processor the another inchoate data record to at least one of the first client and the second client.

14. The method of claim 11, further comprising:

computing by the first computer processor a third cryptographic signature from the first private key;

creating by the first computer processor another inchoate data record comprising:
 a commit input for receiving the commit data from the commit transaction;
 a refund output comprising a refund data; and
 the third cryptographic signature; and publishing by the first computer processor the another inchoate data record to at least one of the first client and the second client.

15. A computing device for processing a transaction between a first client device, and a second client device via a transfer mechanism, the transfer mechanism comprising a decentralized digital currency, the computing device comprising:

a memory for storing a first asymmetric key pair, the first asymmetric key pair comprising a first private key and a first public key;

a network interface for receiving terms, the terms comprising:
 at least one of a first principal data or a second principal data; and
 a reference to at least one of a first data source or a second data source;

a computer processor coupled to the memory and the network interface, the computer processor configured to:
 read the first private key from the memory;
 compute a first cryptographic signature from the first private key;
 create an inchoate data record referencing:
  a commit input for receiving a commit data from a commit transaction;
  one or more output data to be obtained from at least one of the first principal data or the second principal data, and information from at least one of the first data source or the second data source; and
  the first cryptographic signature; and
 publish the inchoate data record to at least one of the first client device or the second client device, wherein the inchoate data record is configured to be signed by at least one of the first client device and second client device after verifying the information to obtain a complete data record for publishing to the transfer mechanism;

wherein the decentralized digital currency comprises a distributed ledger that enables processing the transaction between the first client device and the second client device, and wherein the inchoate data record is configured to be used by at least one of the first client device or the second client device to create a complete data record and to create the transaction by broadcasting the complete data record for transmitting and receiving among network participants in the computer network for recording in the distributed ledger.

16. The device of claim 15, where:

the computer processor is configured to obtain the one or more output data based on:
 the first principal data; and
 the information.

17. The device of claim 15, where the computer processor is further configured to:

compute a second cryptographic signature from the first private key;

create an another inchoate data record referencing:
 a commit input for receiving the commit data from the commit transaction;
 a refund output comprising a refund data;
 the second cryptographic signature; and
 a lock time; and publish the another inchoate data record to at least one of the first client device or the second client device.

18. The device of claim 15, where:

the memory further stores a second asymmetric key pair, the second asymmetric key pair comprising a second private key and a second public key; and the computer processor is further configured to:
 read the second private key from the memory;
 compute a third cryptographic signature from the second private key;
 create a commit transaction data record, the commit transaction data record referencing:
  a first principal input for receiving the first principal data from a first principal transaction;
  a commit output comprising the commit data; and
  the third cryptographic signature; and
 create the commit transaction by submitting the commit transaction data record to the transfer mechanism.

19. The device of claim 18, where the first asymmetric key pair consists of the second asymmetric key pair, the first private key consists of the second private key, and the first public key consists of the second public key.

20. The device of claim 15, where:

the reference to the first data source comprises at least one of a reference to a base instrument and a reference to a quote instrument; and the computer processor is further configured to compute the output data on or after the expiration of a timestamp.

21. A system for processing a transaction between a first client device and a second client device via a transfer mechanism, the system comprising:
  a computing device, and
  the first client device,
  the system configured to communicate with the second client device and the transfer mechanism;
  the computing device comprising:
    a first memory for storing a first asymmetric key pair, the first asymmetric key pair comprising a first private key and a first public key;
    a first network interface for receiving terms, the terms comprising:
      at least one of a first principal data or a second principal data;
      a reference to at least one of a first data source or a second data source; and
      an expiration timestamp; and
    a first computer processor coupled to the first memory and the first network interface, the first computer processor configured to:
      read the first private key from the first memory;
      compute a first cryptographic signature from the first private key;
      create an inchoate data record referencing:
        a commit input for receiving a commit data from a commit transaction;
        one or more outputs to be obtained from at least one of the first principal data or the second principal data, and information from at least one of the first data source or the second data source; and
        the first cryptographic signature; and
      publish the inchoate data record to at least one of the first client device or the second client device;
  wherein the inchoate data record is configured to be signed by at least one of the first client device and second client device after verifying the information to obtain a complete data record for publishing to the transfer mechanism;
  the first client device comprising:
    a second memory for storing a second asymmetric key pair, the second asymmetric key pair comprising a second private key and a second public key;
    a second network interface; and
    a second computer processor coupled to the second memory and the second network interface, the second computer processor configured to:
      read the second private key from the second memory;
      read the inchoate data record;
      compute a second cryptographic signature from the second private key;
      in response to verifying the information, creating a complete data record comprising: the commit input; the output data; the first cryptographic signature; and the second cryptographic signature; and
      create a transaction by submitting the complete data record to the transfer mechanism;
  wherein the first client device signs the inchoate data record,
  wherein the transfer mechanism implements a decentralized digital currency or unit of account that comprises a distributed ledger that enables processing the transaction between the first client device and the second client device without the need for a trusted central authority, and
  wherein the transaction is created by broadcasting the complete data record for transmitting and receiving among network participants in the computer network for recording in the distributed ledger.

22. The system of claim 21, where the first computer processor is further configured to:
  compute a third cryptographic signature from the first private key;
  create another inchoate data record referencing:
    a commit input for receiving the commit data from the commit transaction;
    a refund output comprising a refund data; and
    the third cryptographic signature; and
  publish the another inchoate data record to at least one of the first client and the second client.

23. The system of claim 21, where:
  the first memory further stores a fourth asymmetric key pair, the fourth asymmetric key pair comprising a fourth private key and a fourth public key;
  the first computer processor is further configured to:
  obtain the one or more output data based on:
    the first principal data; and
    the information;
  read the fourth private key from the first memory;
  compute a third cryptographic signature from the fourth private key;
  create a commit transaction data record referencing:
    a first principal input for receiving the first principal data from a first principal transaction;
    a commit output comprising the commit data; and
    the third cryptographic signature; and
  create the commit transaction by submitting the commit transaction data record to the transfer mechanism.

24. The system of claim 23, where the second computer processor is configured to:
  compute a fourth cryptographic signature from the second private key;
  create a first principal transaction data record referencing:
    a first principal output comprising the first principal data; and
    the fourth cryptographic signature; and
  create the first principal transaction by submitting the first principal transaction data record to the transfer mechanism.

25. The system of claim 21, where:
  the reference to at least one of the first data source or the second data source comprises at least one of a reference to a base instrument or a reference to a quote instrument; and
  the first computer processor is further configured to obtain the output data on or after the expiration timestamp.

26. The system of claim 21, where:
  the second computer processor is further configured to:
  compute a third cryptographic signature from the second private key; create a first principal transaction data record comprising:
  a first principal output comprising the first principal data; and
  the third cryptographic signature; and
  create a first principal transaction by submitting the first principal transaction data record to the transfer mechanism;
  wherein the system further comprises the second client device, the second client device comprising:

a third memory for storing a third asymmetric key pair, the third asymmetric key pair comprising a third private key and a third public key;
a third network interface; and
a third computer processor coupled to the third memory and the third network interface, the third computer processor configured to:
read the third private key from the third memory;
compute a fourth cryptographic signature from the third private key;
create a second principal transaction data record comprising:
a second principal output comprising the second principal data; and
the fourth cryptographic signature; and
create a second principal transaction by submitting the second principal transaction data record to the transfer mechanism.

27. A method for processing a transaction between a first client device and a second client device via a transfer mechanism, the transfer mechanism implementing a decentralized digital currency comprising a distributed ledger, or unit of account that is accounted for in a ledger, that is accessible via a computer network by a computer device, the first client device, and the second client device, respectively, the method comprising:
storing a first asymmetric key pair in a first memory, the first asymmetric key pair comprising a first private key and a first public key;
storing a second asymmetric key pair in a second memory, the second asymmetric key pair comprising a second private key and a second public key;
storing a third asymmetric key pair in the second memory, the third key pair comprising a third private key and a third public key;
storing a fourth asymmetric key pair in a third memory, the fourth asymmetric key pair comprising a fourth private key and a fourth public key;
transmitting terms from one of the first or second client device via a first network interface, the terms comprising:
at least one of a first principal data or a second principal data;
a reference to at least one of a first data source or a second data source; and
an expiration timestamp;
receiving the terms at the computer device via a second network interface;
reading the first private key from the first memory;
computing a first cryptographic signature from the first private key;
creating a first principal transaction data record comprising:
a first principal output comprising the first principal data; and
the first cryptographic signature;
creating a first principal transaction by submitting the first principal transaction data record to the transfer mechanism;
reading the second private key from the second memory;
computing a second cryptographic signature from the second private key;
creating a commit transaction data record referencing:
a first principal input for receiving the first principal data from the first principal transaction;
a commit output comprising a commit data; and
the second cryptographic signature;
creating the commit transaction by submitting the commit transaction data record to the transfer mechanism;
retrieving a information from the first data source;
reading the third private key from the second memory;
computing a third cryptographic signature from the third private key;
creating an inchoate data record referencing:
a commit input for receiving a commit data from the commit transaction;
one or more output data obtained from at least one of the first principal data or the second principal data and the information from the first data source; and
the third cryptographic signature;
publishing the inchoate data record;
reading the inchoate data record;
signing the inchoate data record;
reading the fourth private key from the third memory;
computing a fourth cryptographic signature from the fourth private key;
creating a complete data record referencing:
the commit input;
the one or more output data;
the third cryptographic signature; and
the fourth cryptographic signature; and
creating the transaction by broadcasting the complete data record for transmitting and receiving among network participants in the computer network for recording in the distributed ledger; and
verifying, via at least one of the computing device, the first client device, or the second client device, the recording of the complete data record in the distributed ledger by observing its external state,
wherein the distributed ledger enables processing the transaction between the first client device and the second client device without the need for a trusted central authority.

28. The method of claim 27, further comprising:
computing a fifth cryptographic signature from the third private key;
creating another inchoate data record referencing:
a commit input for receiving the commit data from the commit transaction;
a refund output comprising a refund data;
the fifth cryptographic signature; and
a lock time; and
publishing the another inchoate data record.

29. The method of claim 27, further comprising:
storing a fifth asymmetric key pair in a fourth memory, the fifth asymmetric key pair comprising a fifth private key and a fifth public key;
reading the fifth private key from the fourth memory;
computing a fifth cryptographic signature from the fifth private key;
creating a second principal transaction data record referencing:
a second principal output comprising the second principal data; and
the fifth cryptographic signature;
creating a second principal transaction by submitting the second principal transaction data record to the transfer mechanism; and
computing one or more output data by applying a disbursement function to:

the information from the first data source; and
at least one of:
  the first principal data; and
  the second principal data.
30. The method of claim 29, further comprising:
computing a sixth cryptographic signature from the third private key;
creating another inchoate data record referencing:
  a commit input for receiving the commit data from the commit transaction;
  one or more refund outputs comprising one or more refund data;
  the sixth cryptographic signature; and
  a lock time; and
publishing the another inchoate data record.
31. The method of claim 27, wherein the one or more output data further comprise one or more conditions requiring approval of at least one of the first client device or the second client device, and the one or more conditions include a condition to determine if a sum of the one or more output data is equal or less than the commit data from the commit transaction.
32. The method of claim 27, wherein the terms further comprise a first collateral data, or a second collateral data;
  wherein the first principal transaction data record further comprises a first collateral output comprising the first collateral data;
  wherein the commit transaction data record further comprises a first collateral input for receiving the first collateral data from the first principal transaction; and
  wherein the one or more output data is obtained from the first principal data and the first collateral data or the second principal data and the second collateral data, and the value from the first data source.
33. A system for processing a transaction between a first client device and a second client device via a transfer mechanism, the system comprising a computing device and the first client device, the system configured to communicate with the second client device and the transfer mechanism;
  the computing device comprising:
    a first memory for storing a first asymmetric key pair, the first asymmetric key pair comprising a first private key and a first public key;
    a first network interface for receiving terms, the terms comprising:
      at least one of a first principal data or a second principal data; and
      a reference to at least one of a first data source or a second data source; and
    a first computer processor coupled to the first memory and the first network interface, the first computer processor configured to:
      read the first private key from the first memory;
      compute a first cryptographic signature from the first private key;
      retrieve a information from at least one of the first data source or the second data source;
      create an inchoate data record comprising:
        a commit input for receiving a commit data from a commit transaction;
        one or more outputs obtained from at least one of the first principal data or the second principal data;
        datum from the information; and
        the first cryptographic signature; and
      publish the inchoate data record to at least one of the first client device or the second client device,
      wherein the inchoate data record is configured to be signed by at least one of the first client device and second client device after verifying the datum to obtain a complete data record for publishing to the transfer mechanism;
  the first client device comprising:
    a second memory for storing a second asymmetric key pair, the second asymmetric key pair comprising a second private key and a second public key;
    a second network interface; and
    a second computer processor coupled to the second memory and the second network interface, the second computer processor configured to:
      read the second private key from the second memory;
      read the inchoate data record;
      compute a second cryptographic signature from the second private key;
      in response to verifying the datum, creating create a complete data record comprising:
        the commit input;
        the output data;
        the first cryptographic signature; and
        the second cryptographic signature; and
      create a transaction by submitting the complete data record to the transfer mechanism;
  wherein the transfer mechanism includes an equipment implementing an accessible centralized digital currency or a unit of account that is accessible via a computer network by the equipment, the first client device, and the second client device, respectively, and that enables processing the transaction between the first client device and the second client device; and
  wherein the transaction is created by broadcasting the complete data record for transmitting and receiving among network participants in the computer network for recording in a centralized ledger.
34. The system of claim 33, wherein the terms further comprise an expiration timestamp that is explicitly or implicitly set from zero to infinity time units.
35. The system of claim 33, wherein:
  the computing device and the first client are the same device;
  the first computer processor and the second computer processor are the same processor;
  the first memory and the second memory are the same memory;
  the first network interface and the second network interface are the same network interface; and
  the first asymmetric key pair and the second asymmetric key pair are the same asymmetric key pair.
36. The system of claim 33, wherein:
  the computing device and the first client are the same device;
  the first computer processor and the second computer processor are the same processor;
  the first memory and the second memory are the same memory; and
  the first network interface and the second network interface are the same network interface.
37. The system of claim 33, wherein the first computer processor is further configured to:
  compute a third cryptographic signature from the first private key;
  create another inchoate data record comprising:
    a commit input for receiving the commit data from the commit transaction;

a refund output comprising a refund data; and
the third cryptographic signature; and
publish the another inchoate data record to at least one of the first client and the second client.

38. The system of claim 35, wherein the first computer processor is further configured to:
compute a third cryptographic signature from the first private key;
create another inchoate data record comprising:
a commit input for receiving the commit data from the commit transaction; and
a refund output comprising a refund data; and the third cryptographic signature; and
publish the another inchoate data record to at least one of the first client and the second client.

39. The system of claim 36, wherein the first computer processor is further configured to:
compute a third cryptographic signature from the first private key;
create another inchoate data record comprising:
a commit input for receiving the commit data from the commit transaction;
a refund output comprising a refund data; and
the third cryptographic signature; and
publish the another inchoate data record to at least one of the first client and the second client.

40. A method to process a transaction between a first client device and a second client device via a transfer mechanism that is accessible via a computer network by a computing device, the first client device, and the second client device, the computing device comprising a first memory, a first network interface, and a first computer processor coupled to the first memory and the first network interface, the first client comprising a second memory, a second network interface, and a second computer processor coupled to the second memory and the second network interface, and the second client device comprising a third memory, a third network interface, and a third computer processor coupled to the third memory and the third network interface, the method comprising:
storing a first asymmetric key pair in the first memory, the first asymmetric key pair comprising a first private key and a first public key;
receiving terms by the first network interface, the terms comprising:
at least one of a first principal data or a second principal data; and
a reference to at least one of a first data source or a second data source; and
reading by the first computer processor the first private key from the first memory;
computing by the first computer processor a first cryptographic signature from the first private key;
retrieving by the first computer processor information from at least one of the first data source or the second data source;
creating by the first computer processor an inchoate data record comprising:
a commit input for receiving a commit data from a commit transaction;
one or more outputs obtained from at least one of the first principal data or the second principal data;
datum from the information; and
the first cryptographic signature;
publishing by the first computing processor the inchoate data record to at least one of the first client device or the second client device, wherein the inchoate data record is configured to be signed by at least one of the first client device and second client device after verifying the datum to obtain a complete data record for publishing to the transfer mechanism;
storing a second asymmetric key pair in the second memory, the second asymmetric key pair comprising a second private key and a second public key;
reading by the second computer processor the second private key from the second memory;
reading by the second computer processor the inchoate data record;
computing by the second computer processor a second cryptographic signature from the second private key;
in response to verifying the datum, creating by the second computer processor a complete data record comprising:
the commit input;
the output data;
the first cryptographic signature; and
the second cryptographic signature; and
creating by the second computer processor a transaction by submitting the complete data record to the transfer mechanism;
wherein the transfer mechanism includes an equipment implementing an accessible centralized digital currency or a unit of account that is accessible via a computer network by the equipment, the first client device, and the second client device, respectively and enables processing the transaction between the first client device and the second client device, and
wherein the transaction is created by broadcasting the complete data record for transmitting and receiving among network participants in the computer network for recording in a centralized ledger.

41. The method of claim 40, wherein the terms further comprise an expiration timestamp that is explicitly or implicitly set from zero to infinity time units.

42. The method of claim 40, wherein:
the computing device and the first client are the same device;
the first computer processor and the second computer processor are the same processor;
the first memory and the second memory are the same memory;
the first network interface and the second network interface are the same network interface; and
the first asymmetric key pair and the second asymmetric key pair are the same asymmetric key pair.

43. The method of claim 40, wherein:
the computing device and the first client are the same device;
the first computer processor and the second computer processor are the same processor;
the first memory and the second memory are the same memory; and
the first network interface and the second network interface are the same network interface.

44. The method of claim 40, further comprising:
computing by the first computer processor a third cryptographic signature from the first private key;
creating by the first computer processor another inchoate data record comprising:
a commit input for receiving the commit data from the commit transaction;
a refund output comprising a refund data; and
the third cryptographic signature; and publishing by the first computer processor the another inchoate data record to at least one of the first client and the second client.

45. The method of claim 42, further comprising:

computing by the first computer processor a third cryptographic signature from the first private key;

creating by the first computer processor another inchoate data record comprising:
- a commit input for receiving the commit data from the commit transaction;
- a refund output comprising a refund data; and
- the third cryptographic signature; and publishing by the first computer processor the another inchoate data record to at least one of the first client and the second client.

46. The method of claim 43, further comprising:

computing by the first computer processor a third cryptographic signature from the first private key;

creating by the first computer processor another inchoate data record comprising:
- a commit input for receiving the commit data from the commit transaction;
- a refund output comprising a refund data; and
- the third cryptographic signature; and publishing by the first computer processor the another inchoate data record to at least one of the first client and the second client.

* * * * *